(12) United States Patent  
Pond et al.

(10) Patent No.: US 7,070,310 B2  
(45) Date of Patent: Jul. 4, 2006

(54) LIGHT EMITTING DIODE HEADLAMP

(75) Inventors: Gregory R. Pond, Jamestown, NY (US); Philip C. Roller, Ashville, NY (US); Chris A. Suckow, Kennedy, NY (US); Ronald D. Madison, Cherry Creek, NY (US); Timothy DiPenti, Russel, PA (US); Todd Kolstee, North Clymer, NY (US)

(73) Assignee: Truck-Lite Co., Inc., Falconer, NY (US)

(*) Notice: Subject to any disclaimer, the term of this patent is extended or adjusted under 35 U.S.C. 154(b) by 0 days.

(21) Appl. No.: 10/677,923

(22) Filed: Oct. 1, 2003

(65) Prior Publication Data

US 2004/0085779 A1    May 6, 2004

Related U.S. Application Data

(60) Provisional application No. 60/507,621, filed on Sep. 30, 2003, provisional application No. 60/414,980, filed on Oct. 1, 2002.

(51) Int. Cl.  
 *F21S 8/10* (2006.01)

(52) U.S. Cl. ............... 362/545; 362/547; 362/516; 362/520

(58) Field of Classification Search ............ 362/545, 362/547, 243, 245, 293, 294, 459, 487, 506, 362/507, 538, 540, 543, 544, 546, 548, 227, 362/230, 231, 247, 235–242, 244, 257, 296, 362/307, 308, 310, 311, 362, 373, 800, 516, 362/520; 313/110, 483, 112–114, 498, 506, 313/501–503, 510  
See application file for complete search history.

(56) References Cited

U.S. PATENT DOCUMENTS

| 3,510,732 | A | * | 5/1970 | Amans ..................... 313/501 |
| 3,676,668 | A | * | 7/1972 | Collins et al. ............ 313/113 |
| 3,821,590 | A | * | 6/1974 | Kosman et al. ........... 313/499 |
| 4,254,453 | A | * | 3/1981 | Mouyard et al. .......... 362/240 |
| 4,729,076 | A | * | 3/1988 | Masami et al. ........... 362/235 |
| 4,733,335 | A | * | 3/1988 | Serizawa et al. ......... 362/545 |
| 4,780,752 | A | * | 10/1988 | Angerstein et al. ...... 257/788 |
| 4,935,665 | A | * | 6/1990 | Murata ..................... 362/545 |
| 5,438,487 | A | * | 8/1995 | Schmid et al. ........... 362/545 |
| 5,490,049 | A |   | 2/1996 | Montalan et al. |
| 5,528,474 | A | * | 6/1996 | Roney et al. ............. 362/545 |
| 5,580,156 | A | * | 12/1996 | Suzuki et al. ............ 362/373 |

(Continued)

FOREIGN PATENT DOCUMENTS

DE          201 15 801 U1    3/2002

(Continued)

OTHER PUBLICATIONS

Keller, Kurtis P.; Efficiency and Costs Tradeoffs Between Aluminum and Zinc-Aluminum Die Cast Heatsinks; ASME InterPack and University of North Carolina-Chapel Hill; 1997 (available at http://www.cs.unc.edu/~keller/Papers/InterPACK97/efficiency.pdf).*

*Primary Examiner*—Sandra O'Shea  
*Assistant Examiner*—Ismael Negron  
(74) *Attorney, Agent, or Firm*—The Bilicki Law Firm, PC

(57) ABSTRACT

A light emitting diode headlamp capable of low beam and high beam functions. The light emitting diode headlamp assembly comprises high-flux light emitting diodes, a reflector subassembly, a first and second light transmissive member, and a heat sink.

23 Claims, 20 Drawing Sheets

U.S. PATENT DOCUMENTS

| | | | |
|---|---|---|---|
| 5,813,752 A * | 9/1998 | Singer et al. | 362/293 |
| 5,851,063 A * | 12/1998 | Doughty et al. | 362/231 |
| 5,857,767 A | 1/1999 | Hochstein | 362/294 |
| 5,962,971 A * | 10/1999 | Chen | 313/512 |
| 6,045,240 A | 4/2000 | Hochstein | 362/294 |
| 6,296,376 B1 | 10/2001 | Kondo et al. | 362/310 |
| 6,318,886 B1 | 11/2001 | Stopa et al. | 362/555 |
| 6,367,949 B1 | 4/2002 | Pederson | 362/240 |
| 6,406,172 B1 | 6/2002 | Harbers et al. | 362/544 |
| 6,431,728 B1 * | 8/2002 | Fredericks et al. | 362/249 |
| 6,529,375 B1 * | 3/2003 | Miyahara et al. | 361/697 |
| 6,558,032 B1 | 5/2003 | Kondo et al. | 362/516 |
| 6,601,982 B1 | 8/2003 | Begemann et al. | 362/545 |
| 6,653,789 B1 * | 11/2003 | Roller et al. | 315/80 |
| 6,773,138 B1 * | 8/2004 | Coushaine | 362/656 |
| 2001/0019486 A1 | 9/2001 | Thominet | 362/543 |
| 2002/0034081 A1 | 3/2002 | Sierzawa | 362/540 |
| 2003/0067786 A1 | 4/2003 | Begemann et al. | 362/543 |

FOREIGN PATENT DOCUMENTS

| | | |
|---|---|---|
| DE | 101 60 052 A1 | 6/2003 |
| EP | 0 905 439 A2 * | 3/1999 |

* cited by examiner

LIGHT EMITTING DIODE HEADLAMP

PRIORITY CLAIM

The present application claims priority to U.S. Provisional Patent Application Ser. No. 60/414,980, filed Oct. 1, 2002, and U.S. Provisional Patent Application Ser. No. 60/507,621, filed Sep. 30, 2003, both of which are incorporated by reference herein in their entireties.

FIELD OF THE INVENTION

The subject invention relates to vehicular lights. More particularly, the embodiments of the subject invention are directed to a headlamp and headlamp assembly for vehicles that uses light emitting diodes as a light source.

BACKGROUND OF THE INVENTION

Most motorized vehicles currently use incandescent or high-intensity discharge sealed-beam headlamps and headlamp assemblies. The embodiments of the subject invention are designed to retrofit the current incandescent sealed-beam headlamps and headlamp assemblies. For example, many heavy-duty vehicles use four (4) inch by six (6) inch, rectangular, sealed-beam headlamps in a quad lamp assembly. In one embodiment of the present invention, four (4) inch by six (6) inch, rectangular, sealed-beam low beam and high beam headlamps, that use light emitting diodes as a light source, form a quad lamp assembly designed to retrofit the incandescent four (4) inch by six (6) inch quad packages. By way of further example, other vehicles use seven (7) inch round, sealed-beam headlamps in a dual lamp assembly. Therefore, in an alternate embodiment of the invention, seven (7) inch round, sealed-beam combined low/high beam headlamps, that use light emitting diodes as a light source, form a two-lamp assembly designed to retrofit the incandescent, seven (7) inch round packages.

The embodiments of the subject invention that are disclosed herein are designed to satisfy the Society of Automotive Engineers (SAE) Standard J1383 for high beam and low beam vehicular headlamps. SAE Standard J1383 specifies certain photometric requirements, including luminous intensity requirements, for vehicular lamps functioning as headlamps.

The Department of Transportation (DOT), in its Federal Motor Vehicle Safety Standards, 49 C.F.R. §571.108 (2000), ("FMVSS 108") regulates all lamps, reflective devices, and associated equipment. FMVSS 108 can be found at www.nhtsa.dot.gov and is hereby incorporated by reference in its entirety. DOT Standard 1383 (part of FMVSS108) adopts the Society of Automotive Engineers (SAE) Standard J1383 (December 1996) for motor vehicle headlamps.

SAE Standard J1383 defines a headlamp as a "lighting device providing an upper and/or lower beam designed to provide illumination forward of the vehicle." SAE Standard J1383 further defines a sealed beam headlamp assembly as "a headlamp assembly which includes one or more sealed beam headlamps." A low beam is a "beam intended to illuminate the road ahead of a vehicle when meeting or following another vehicle." A high beam is a "beam intended primarily for distant illumination for use when not meeting or following other vehicles." SAE Standard J1383 also requires that the color of the emanating light produced by a headlamp shall be white as defined in SAE Standard J578.

SAE Standard J1383 also specifies certain requirements for vehicular lamps functioning as headlamps, including minimum and/or maximum luminous intensity requirements. According to the aforementioned standards, a minimum and/or maximum luminous intensity must exist at various points in the illumination zone to be in compliance. These specific photometric requirements for vehicular low beam and high beam headlamps, as set forth in SAE Standard J1383, are included hereinbelow.

TABLE 1

| PHOTOMETRIC SPECIFICATION - LOW BEAM | | |
|---|---|---|
| Low Beam | Minimum (cd) | Maximum (cd) |
| 10 U to 90 U, 45° R to 45° L | | 125 |
| 8 L to 8 R, H to 4 U | 64 | |
| 4 L to 4 R, H to 2 U | 125 | |
| 1 U to 1-½ L to L | | 700 |
| ½ U to 1-½ L to L | | 1000 |
| ½ D to 1-½ L to L | | 3000 |
| 1-½ U to 1 R to R | | 1400 |
| ½ U to 1 R, 2 R, 3 R | | 2700 |
| ½ D to 1-½ R | 8000 | 20000 |
| 1 D to 6 L | 750 | |
| 1-½ D to 2 R | 15000 | |
| 1-½ D to 9 L and 9 R | 750 | |
| 2 D to 15 L and 15 R | 700 | |
| 4 D to 4 R | | 8000 |

TABLE 2

| PHOTOMETRIC SPECIFICATION - HIGH BEAM | | |
|---|---|---|
| High Beam | Minimum (cd) | Maximum (cd) |
| 2 U to V | 1500 | |
| 1 U to 3 R and 3 L | 5000 | |
| H to V | 20000 | 75000 |
| H to 3 R and 3 L | 10000 | |
| H to 6 R and 6 L | 3250 | |
| H to 9 R and 9 L | 2000 | |
| H to 12 R and 12 L | 500 | |
| 1-½ D to V | 5000 | |
| 1-½ D to 9 R and 9 L | 1500 | |
| 2-½ D to V | 2000 | |
| 2-½ D to 12 R and 12 L | 750 | |
| 4 D to V | | 12500 |
| Maximum Beam Candela[1] | 30000 | |

[1]The highest candela reading found in the beam pattern

SAE J578, entitled "Color Specification", sets forth the definition for white light as applied to headlamps. The definition applies to the overall effective color of light emitted by a headlamp in any given direction and not to the color of the light from a small area of the lens. In SAE J578, the fundamental requirements for color are expressed as chromaticity coordinates according to the CIE (1931) standard colorimetric system.

Pursuant to SAE J578, the following requirements for white light shall apply when measured by the tristimulus or spectrophotometric methods, as are well known in the art.

TABLE 4

| WHITE LIGHT (ACHROMATIC) |
|---|
| The color of light emitted from the headlamp shall fall within the following boundaries: |
| x = 0.31 (blue boundary) |
| x = 0.50 (yellow boundary) |
| y = 0.15 + 0.64x (green boundary) |
| y = 0.05 + 0.75x (purple boundary) |
| y = 0.44 (green boundary) |
| y = 0.38 (red boundary) |

SAE J1383 standard and SAE J578 standard can also be found at www.sae.com and are hereby incorporated by reference in their entirety, as is FMVSS 108, 49 C.F.R. §571.108 (2000).

As mentioned above, one embodiment of the subject invention relates to a headlamp quad assembly that incorporates four (4) individual headlamps (i.e. 2 low beam lamps and 2 high beam headlamps). In this embodiment, each individual headlamp is a four (4) inch by six (6) inch, rectangular sealed-beam lamp. In an alternate embodiment, a dual headlamp assembly incorporates two (2) combined, high/low beam headlamps, wherein each individual headlamp is a seven (7) inch round sealed-beam lamp. In still another embodiment of the two-lamp assembly, each individual headlamp is a five (5) inch by seven (7) inch rectangular sealed-beam lamp. In each of the embodiments, the individual lamps forming a headlamp assembly emit white light (as defined above).

DETAILED DESCRIPTION OF EMBODIMENTS OF THE INVENTION

Figure 1:
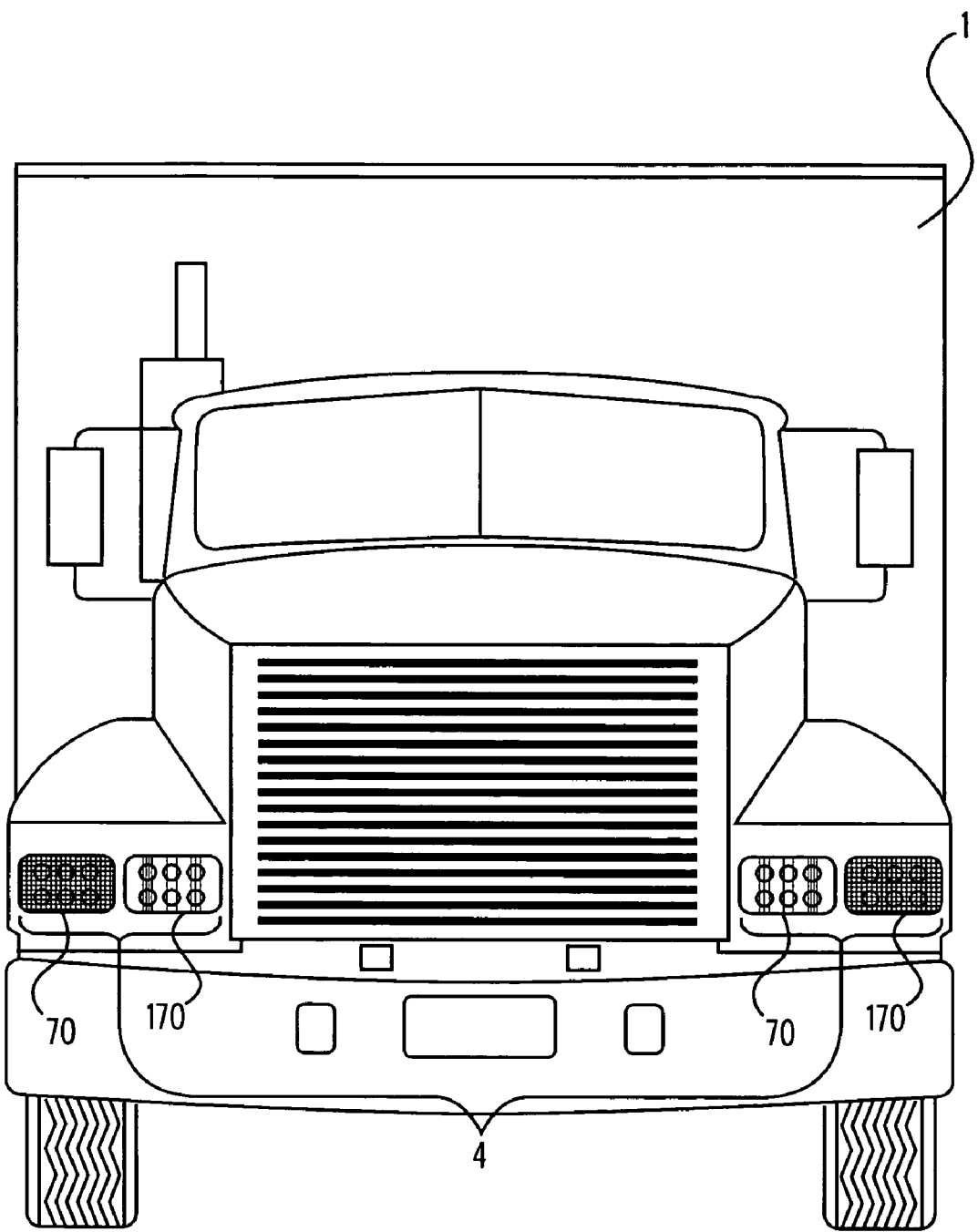
FIG. 1 is a diagrammatic, front-end view of a heavy-duty vehicle provided with a light emitting diode headlamp assembly according to one embodiment of the present invention.

For the purpose of promoting an understanding of the present invention, references are made in the text hereof to embodiments of a low beam and high beam light emitting diode headlamp and headlamp assembly, some of which are illustrated in the drawings. It is nevertheless understood that no limitations to the scope of the invention are thereby intended. One of ordinary skill in the art will readily appreciate that modifications such as these involving the shape of the low and high beam headlamps, type or number of light emitting diodes, number of reflector units, or type and placement of optical elements of the lens, do not depart from the spirit and scope of the present invention. Some of these possible modifications are mentioned in the following description. In the embodiments depicted, like reference numerals refer to identical structural elements in the various drawings.

FIG. 1 is a diagrammatic, front-end view of a heavy-duty vehicle 1 provided with a preferred embodiment of the present invention, namely a sealed beam headlamp assembly 4 that uses light emitting diodes as a light source. In the embodiment shown here, headlamp assembly 4 is a four (4) inch by six (6) inch, quad headlamp package. Accordingly, as shown here, headlamp assembly 4 comprises four individual sealed headlamps: two (2) low beam headlamps 70 and two (2) high beam headlamps 170, each of the four individual headlamps utilizing light emitting diodes as a light source. In this embodiment, the low and high beam headlamps are identical, except for the outer lens that distributes the light appropriately to satisfy the SAE requirements.

In the embodiment shown in FIG. 1, and as described herein, headlamps 70 function as low beam headlamps that satisfy the photometric, dimensional, color and other requirements for low beam headlamps as set forth in SAE Standard J1383. Similarly, headlamps 170 function as high beam headlamps that satisfy the photometric, dimensional, color and other requirements for high beam headlamps as set forth in SAE Standard J1383. For example, in the embodiment shown here, low beam headlamps 70 and high beam headlamps 170 are rectangular in shape and approximately four (4) inches by six (6) inches to comply with the dimensional requirements of SAE Standard J1383. One of ordinary skill in the art will readily appreciate, however, that a sealed-beam headlamp assembly according to the instant invention can also comprise combined low/high beam headlamps with alternate shapes and/or dimensions and still comply with SAE Standard J1383. For example, in one alternate embodiment, a headlamp assembly utilizes two combined low beam/high beam headlamps that are round in shape with a seven (7) inch diameter (see FIGS. 16A–C). Alternatively, the headlamp assembly utilizes two combined low beam/high beam headlamps that are rectangular in shape and approximately five (5) inches by seven (7) inches (not shown).

Moreover, the overall effective color of light emitted by low beam headlamps 70 and high beam headlamps in any given direction is white to satisfy SAE Standard J1383. As indicated hereinabove, SAE Standard J578 expresses the fundamental requirements for white light as chromaticity coordinates according to the CIE (1931) standard colorimetric system (see Tables 3–4 above).

Referring further to FIG. 1, in an embodiment of the quad headlamp assembly, two (2) headlamps 70 are operatively arranged as the two outer headlamps of headlamp assembly 4 to perform the low beam function and two (2) headlamps 170 are operatively arranged as the two inner headlamps of headlamp assembly 4 to perform the high beam function. Referring further to FIG. 1, each low beam headlamp 70 and each high beam headlamp 170 is a separate unit with a separate housing that is mounted individually to the front end of vehicle 1, thereby forming headlamp assembly 4. However, in alternate embodiments of the invention, headlamp assembly 4 can comprise low beam headlamp 70 and high beam headlamp 170 as separate units that are joined together prior to mounting or each pair of low beam headlamp 70 and high beam headlamp 170 can share a single housing. The method and manner of mounting headlamp assembly 4 to vehicle 1 are well known to one of ordinary skill in the art.

Figure 2:
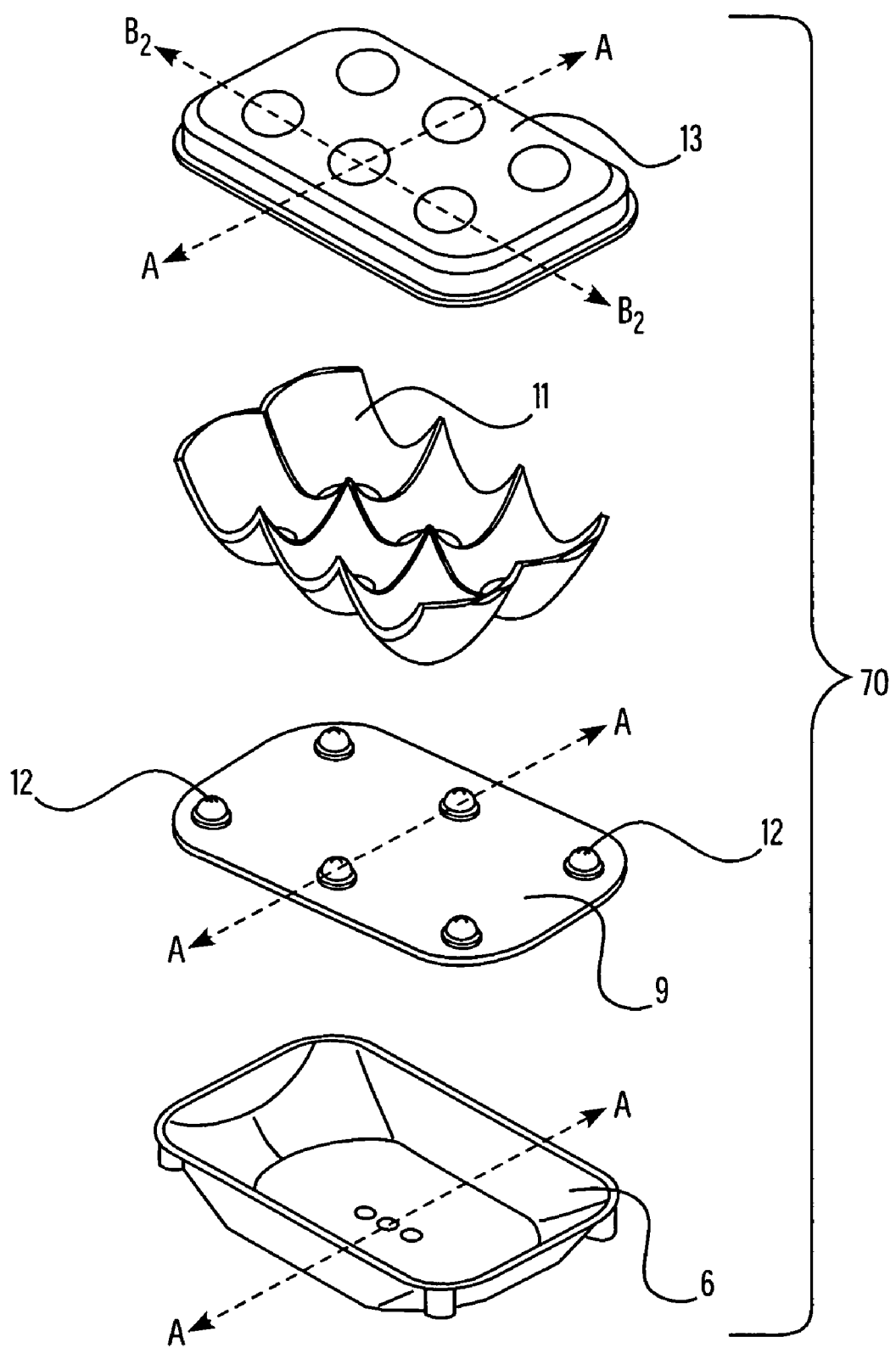
FIG. 2 is an exploded perspective view of a low beam headlamp according to one embodiment of the present invention.

FIG. 2 is an exploded perspective view of an individual low beam headlamp 70. Low beam headlamp 70, in this embodiment of the invention, is comprised of a housing 6, a reflector subassembly 11, a plurality of high-flux light emitting diodes 12, an outer light transmissive member 13, and a planar substrate 9. Headlamp 70 further comprises a plurality of inner light transmissive members 17, disposed behind outer light transmissive member 13 (and, therefore, not shown here). A drive circuit 5, discussed in more detail hereinbelow, is also provided for headlamp 70.

In FIG. 2, headlamp 70 is shown to include a total of six (6) high-flux light emitting diodes 12. In this embodiment, light emitting diodes 12 are configured in a two-dimensional array having two horizontal rows and three vertical columns to create a 2×3 matrix. In this embodiment, light emitting diodes 12 are mounted on planar substrate 9 with their primary axis horizontal to the ground and parallel with the longitudinal axis of vehicle 1, such that the light emitted from each of light emitting diodes 12 is directed away from planar substrate 9. In an alternate embodiment of a combined high/low beam headlamp, light emitting diodes 12 are configured in a circular pattern and mounted on a circular planar substrate (See FIG. 16C).

In all of the embodiments disclosed herein, a high-flux light emitting diode is defined as a light emitting diode capable of producing a minimum flux of at least 50–55 lumens, and an average flux of approximately 70 lumens. For example, but not intending to be limiting, a plurality of 3-Watt Luxeon™ Lambertian-style light emitting diodes, manufactured by LumiLeds Lighting B.V., are used.

Figure 3:
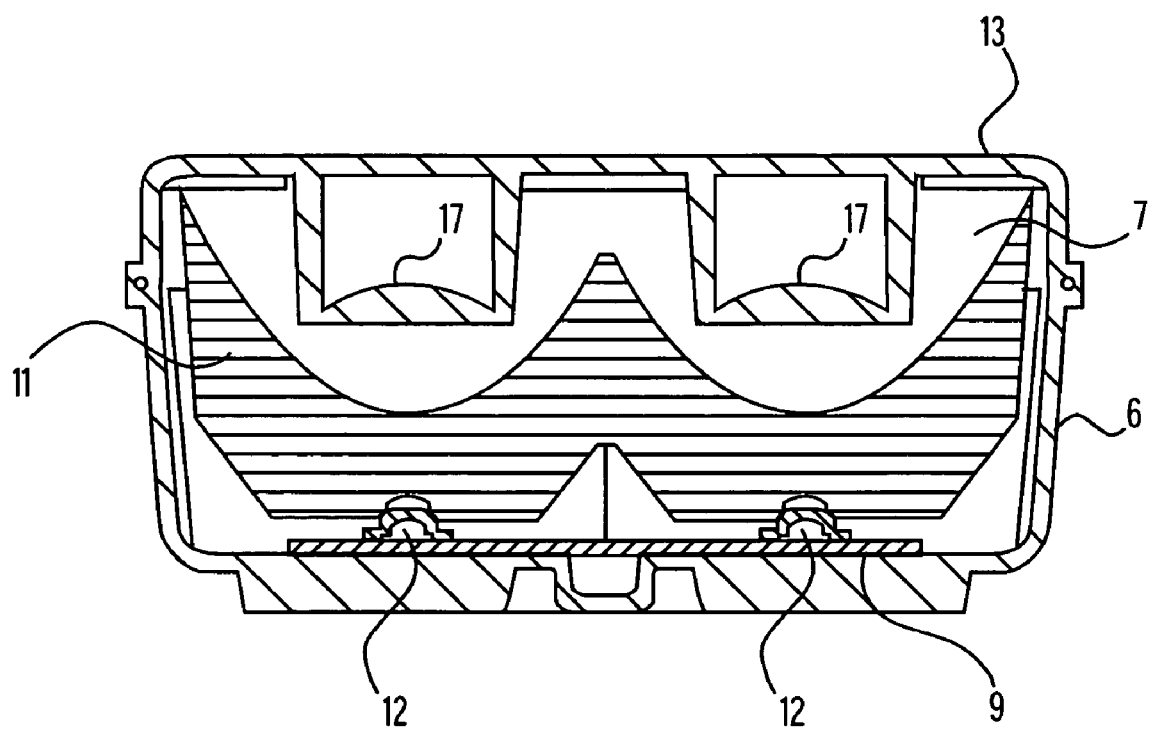
FIG. 3 shows a vertical cross section of the low beam headlamp in FIG. 2.

FIG. 3 shows a cross section along axis A—A (see FIG. 2) of low beam headlamp 70. Referring to FIG. 3, headlamp 70 includes housing 6 and outer light transmissive member 13. In this embodiment, and as will be described in more detail below, outer light transmissive member 13 is a lens with at least one optical surface for directing light emitted from light emitting diodes 12. Outer light transmissive member 13 also functions to form a cover for housing 6, defining a three-dimensional space 7 therebetween. In the embodiment shown in FIG. 3, outer light transmissive member 13 is hermetically sealed to housing 6 with an adhesive that additional functions as a sealant. For example, one of ordinary skill in the art will readily appreciate that RTV silicone or urethane can be used as the adhesive.

Referring further to FIG. 3, headlamp 70 again is shown to comprise reflector subassembly 11, high-flux light emitting diodes 12, and planar substrate 9. Headlamp 70 is also shown to include a plurality of inner light transmissive members 17 fixedly secured to light transmissive member 13.

In FIG. 3, it can be seen that light emitting diodes 12 are disposed at the base of reflector subassembly 11 and mounted to planar substrate 9. Planar substrate 9 is a circuit board in the embodiment shown here. More specifically, planar substrate 9 is an aluminum core circuit board that is mounted directly on housing 6.

In alternate embodiments, planar substrate 9 can be a conventional circuit board. In such an embodiment (not shown), light emitting diodes 12 are secured to planar substrate 9 via mounting posts with heat transfer properties, wherein the mounting posts correspond to holes in planar substrate 9. Such a mounting method is described in U.S. Pat. No. 5,857,767 (Hochstein), U.S. Pat. No. 6,428,189 (Hochstein) and U.S. Pat. No. 6,582,100 (Hochstein). In still another embodiment, a very thin Fiberglass Reinforced Polyester circuit board can be used as planar substrate 9, which would provide adequate heat transfer away from light emitting diodes 12 and, thereby, eliminate the need for an aluminum circuit board or mounting posts.

Figure 4A:
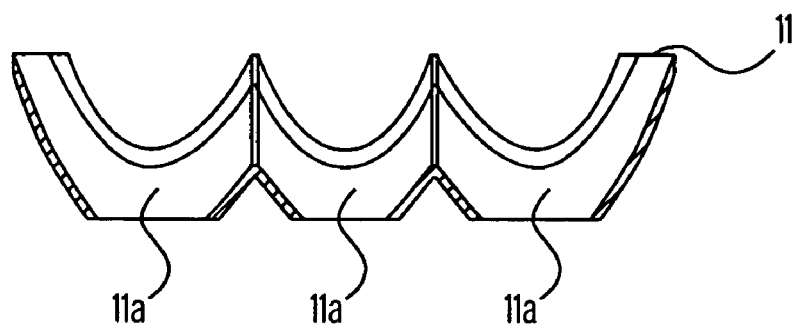
FIGS. 4A–4C illustrate a cross-sectional, perspective and plan view, respectively, of a reflector subassembly according to one embodiment of the present invention.
Figure 4B:
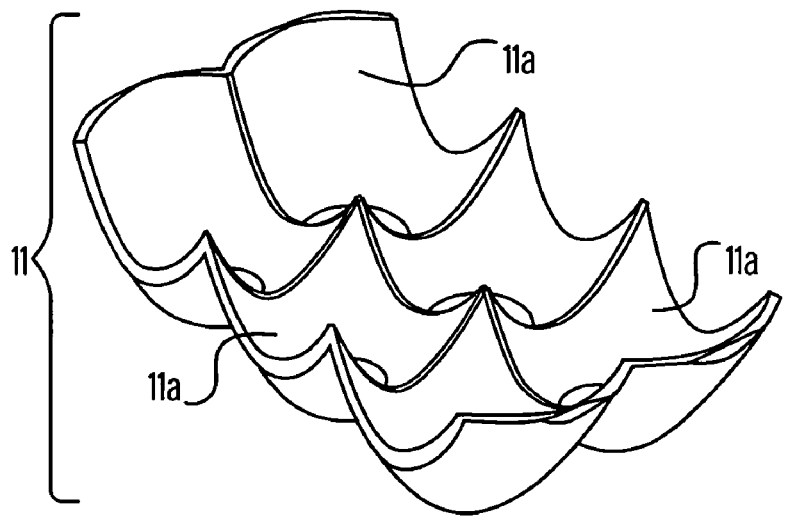
Figure 4C:
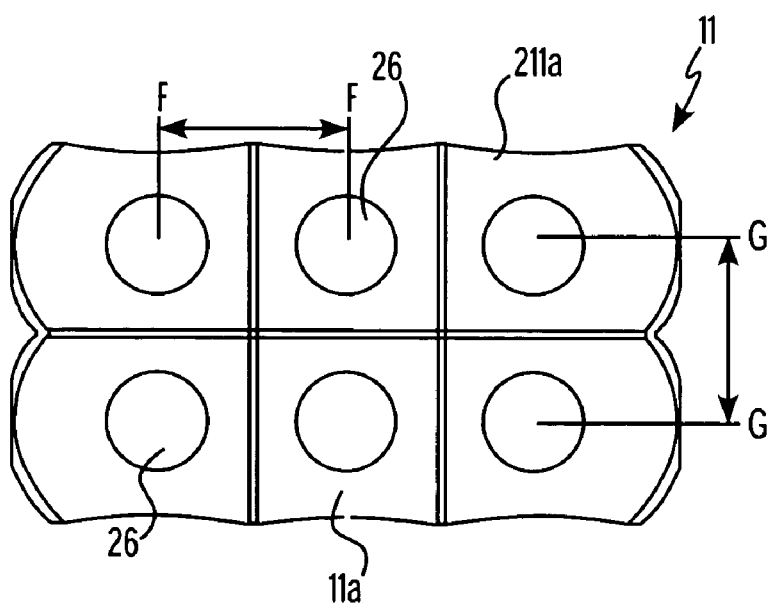

FIG. 4A illustrates a cross-sectional view of reflector subassembly 11. FIG. 4B illustrates a perspective view of reflector subassembly 11. FIG. 4C illustrates a top planar view of reflector subassembly 11. In the embodiment shown in FIGS. 4A–4C, reflector subassembly 11 is a unitary reflector subassembly. Reflector subassembly comprises a plurality of reflector units 11a arranged in a plurality of rows. Each individual reflector unit 11a has an aperture 26, which corresponds to one light emitting diode 12. Specifically, reflector subassembly comprise six (6) reflector units 11a forming a 2×3 array such that each individual reflector unit 11a corresponds to an individual light emitting diode 12. In an alternate embodiment of a combined high/low beam headlamp, reflector subassembly combines fourteen (14) individual reflector units forming a circular arrangement such that each individual reflector unit corresponds to one of fourteen (14) individual light emitting diodes (see FIGS. 16A–C).

In the embodiment shown, each individual reflector unit 11a is a parabolic revolution with a 6 mm focal length. More specifically, but not intended to be limiting, in the embodiment shown here, distance G—G is approximately 44 mm; distance F—F is approximately 44 mm, and each aperture 26 has a diameter of 24 mm. More generally, each reflector unit 11a collects and collimates a portion of the light emitted from the corresponding light emitting diode 12 (see FIG. 13A). The resulting light rays are substantially parallel to the longitudinal axis of the lamp and directed toward the outer light transmissive member (not shown in FIGS. 4A–4C).

In the embodiment shown, reflector subassembly 11 is constructed of a metalized thermoplastic material. Specifically, reflector subassembly 11 is a single piece of molded polycarbonate plastic that is subsequently metalized with aluminum. In alternate embodiments, reflector subassembly 11 can be constructed of a naturally reflective material, or can be coated with other reflective materials, such as white or silver paint. In addition, although the embodiment shown here depicts a unitary reflector subassembly with six reflector units, in an alternate embodiment each reflector unit 11a can be molded as a plurality of individual reflectors.

Figure 5A:
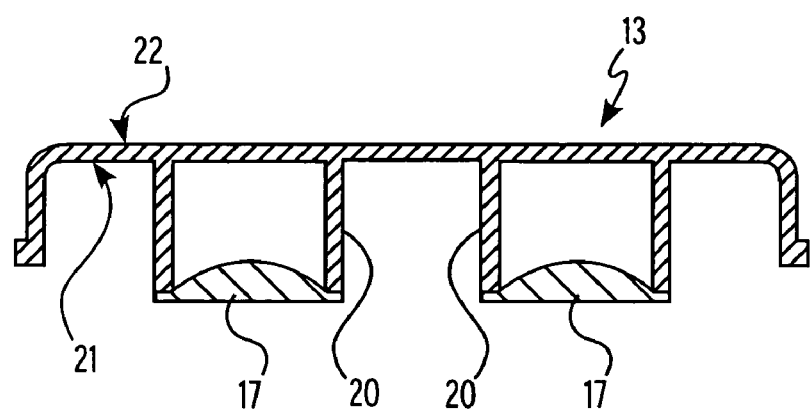
FIG. 5A illustrates a vertical cross-sectional view of inner and outer light transmissive members according to one embodiment of a low beam headlamp.

FIG. 5A illustrates a cross section of outer light transmissive member 13 along vertical line A—A, as shown in FIG.

Figure 5B:
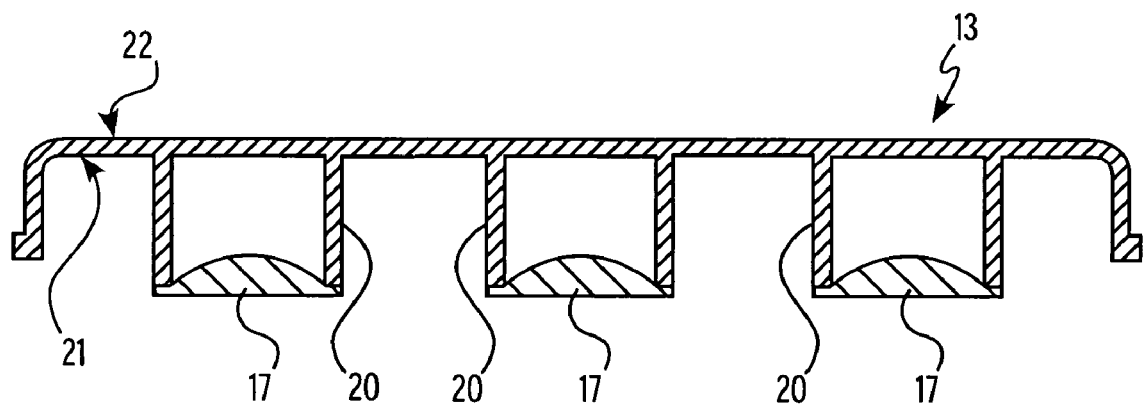
FIG. 5B illustrates a longitudinal cross-sectional view of inner and outer light transmissive members according to one embodiment of the low beam headlamp.

2, and FIG. 5B illustrates a cross section along longitudinal line $B_2$—$B_2$. As can be seen in FIGS. 5A–5B, light transmissive member 13 has an inner surface 21 and outer surface 22.

A plurality of annular extensions 20 corresponding to light emitting diodes 12 are integral to outer light transmissive member 13, extending laterally from inner surface 21 toward reflector subassembly 11. Each annular extension 20 functions as an alignment mechanism for an inner light transmissive member 17. In the embodiment shown, there are six (6) annular extensions 20 and six (6) inner light transmissive members 17, each corresponding to one of the six (6) light emitting diodes 12. Inner light transmissive members 17 are fixedly secured (as described below) to annular extensions 20 to maintain the correct position relative to one (1) corresponding light emitting diode 12. More specifically, annular extensions 20 align each inner light transmissive member 17 relative to one (1) light emitting diode 12 such that each inner light transmissive member 17 is positioned substantially parallel to outer light transmissive member 13 and in front of one (1) corresponding light emitting diode 12.

In alternate embodiments, other alignment mechanisms for light transmissive members 17 may be used. For example, although not shown, one could use three-legged extensions that laterally extend toward the reflector subassembly or disc-like extensions from the outer light transmissive member that laterally extend toward the reflector subassembly. In addition, one could use a plurality of annular extensions or three-legged extensions that lateral extend from the planar substrate (not shown).

Figure 5C:
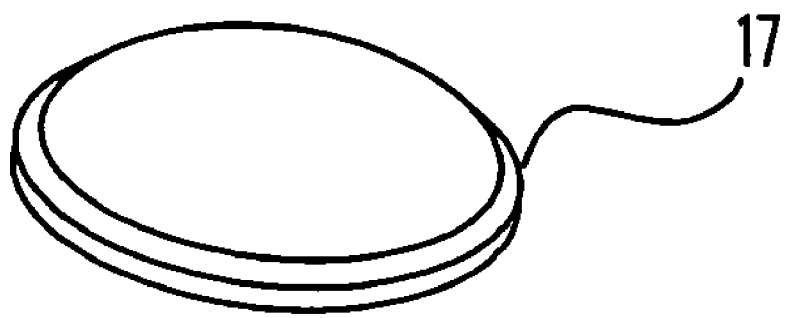
FIGS. 5C–5D illustrate a perspective and top plan view of the inner light transmissive member shown in FIGS. 5A–5B.
Figure 5D:

Inner light transmissive members 17 are collimating lenses with a 24 mm back focal length. FIGS. 5c–5d illustrate a perspective and cross-sectional view of one light transmissive member 17, respectively. Each inner light transmissive member 17 captures the light rays that bypass reflector units 11a, and then concentrates and directs the captured light rays toward outer light transmissive member 13. More specifically, each inner light transmissive member 13 captures the light rays emitted in a cone extending approximately forty-four (44) degrees from a corresponding light emitting diode 12. In the embodiment shown here, each light transmissive member 17 is an aspheric lens that is operatively mounted to outer light transmissive member 13 via annular extensions 20. In one embodiment, each light transmissive member 17 is fixedly secured to an annular extension 20 via a snap-lock mechanism. In alternate embodiments, inner light transmissive members 17 can each be fixedly secured to annular extensions 20 via ultrasonic welding, ultrasonic swaging, heat staking, or adhesives.

In one embodiment, outer light transmissive member 13 is formed of a singularly molded piece of clear, polycarbonate plastic. Similarly, inner light transmissive members 17 are formed of a molded piece of clear, polycarbonate plastic.

Figure 6:
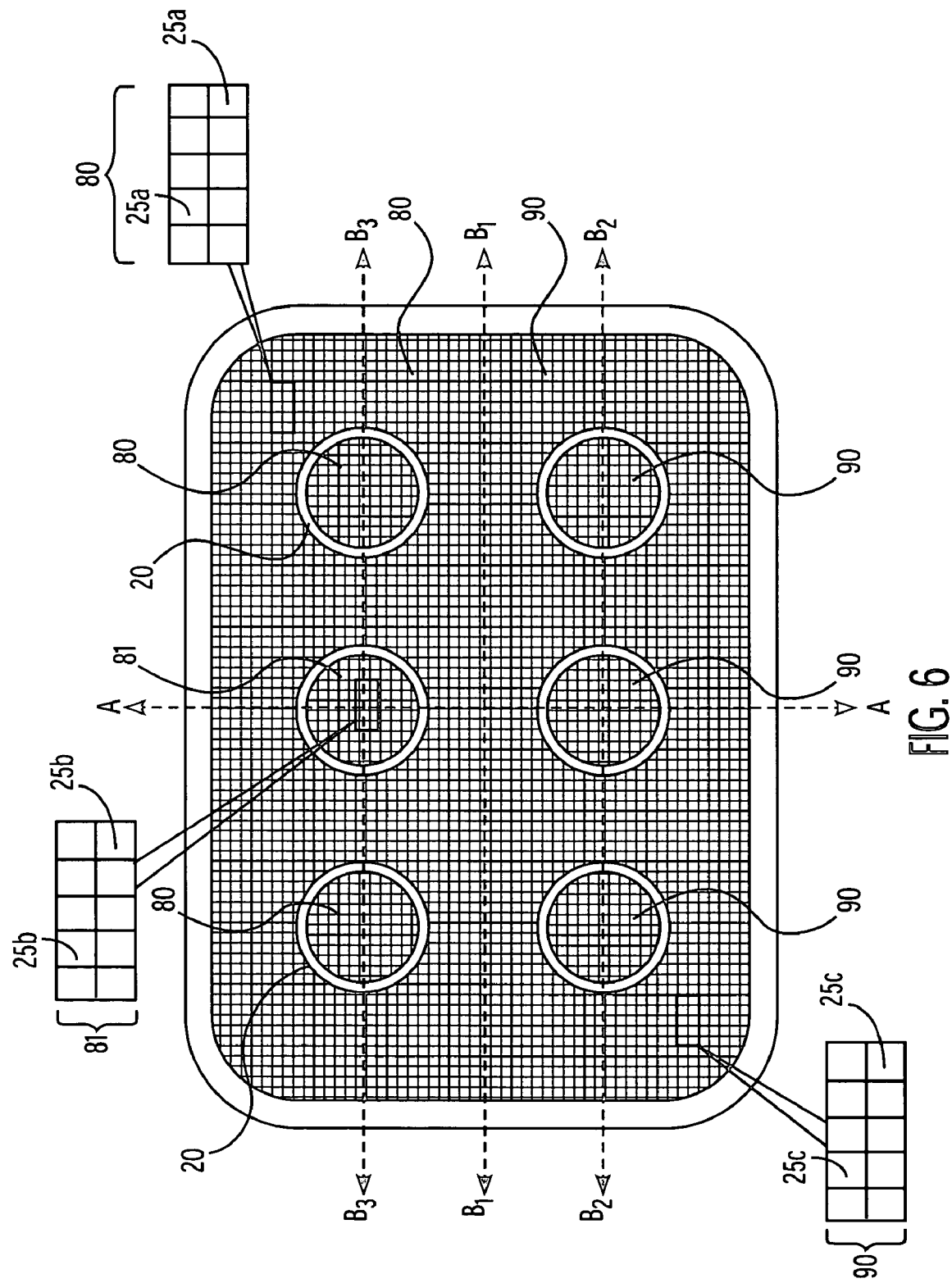
FIG. 6 shows a rear plan view of the outer light transmissive member for the low beam headlamp shown in FIGS. 1–2.

FIG. 6 shows a rear top plan view of outer light transmissive member 13 as provided in low beam headlamp 70. Referring to FIG. 6, longitudinal axis of headlamp 70 is defined as line $B_1$—$B_1$, and vertical axis of headlamp 70 is defined as line A—A.

As can be seen, in this embodiment outer light transmissive member 13 is a lens with a plurality of individual prism optics 25a,b,c forming a rectangular array on inner surface 21. By varying the radius, curvature, or thickness of the individual prism optics 25a,b,c, different desired light patterns can be achieved to satisfy the photometric and luminescence requirements for low beam headlamps as set forth in SAE Standard J1383. For example, in the embodiment shown in FIG. 6, outer light transmissive member 13 has three distinct optical surfaces formed on inner surface 21. The upper portion above longitudinal axis $B_1$—$B_1$ has optical surface 80 and optical surface 81, and the lower portion below longitudinal axis $B_1$—$B_1$ has optical surface 90. In general, optical surface 80 uniformly spreads the light in the horizontal direction at a wide angle, approximately 25–30 degrees left and right of vertical axis A—A. Optical surface 81 spreads the light horizontally in a narrow pattern and vertically, to produce a light pattern approximately eight (8) degrees left to eight (8) degrees right of vertical axis A—A and approximately zero (0) degrees to four (4) degrees up from longitudinal axis $B_1$—$B_1$. Finally, optical surface 90 spreads the light both vertically and horizontally, to produce a light pattern approximately two (2) degrees down from longitudinal axis $B_1$—$B_1$ and approximately two (2) degrees right of vertical axis A—A. In this way, optical surface 90 produces a high intensity area below and to the right of center as required by SAE Standard J1383.

More specifically, but not intending to be limiting, in the embodiment shown in FIG. 6, optical surface 80 comprises a plurality of prism optics 25a; optical surface 81 comprises a plurality of prism optics 25b; and optical surface 90 comprises a plurality of prism optics 25c.

Figure 7A:
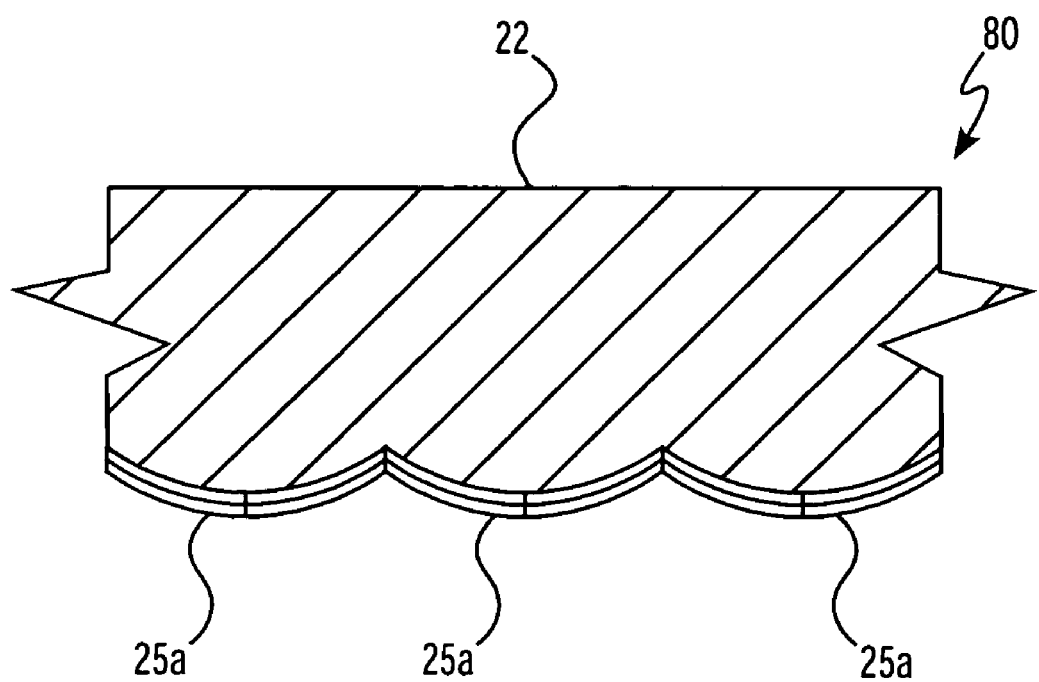
FIGS. 7A–7F illustrate partial longitudinal and vertical cross-sections of to the optical surfaces formed on the outer light transmissive member shown in FIG. 6.
Figure 7B:
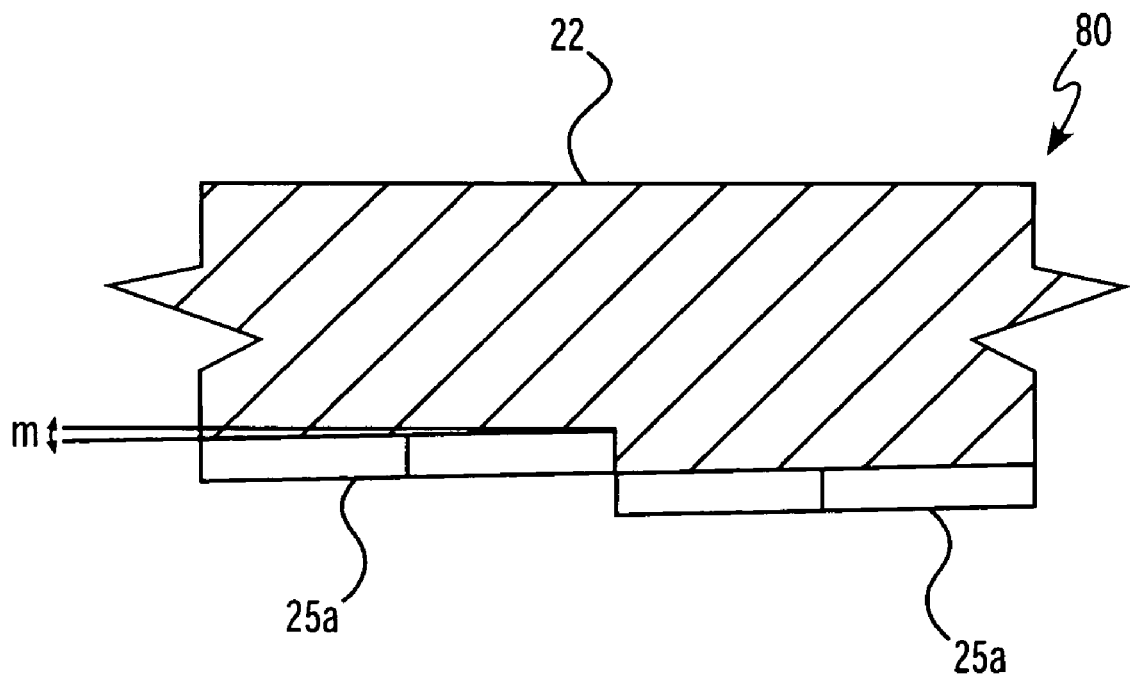

In FIG. 7A, a portion of optical surface 80 is shown in longitudinal cross-sectional view (along line $B_3$—$B_3$). Prism optics 25a preferably have a longitudinal cross sectional profile that is generally convex toward light emitting diodes 12. More specifically, as shown here, the longitudinal cross section of prism optics 25a has a radius of curvature that is approximately 2.804 mm. In FIG. 7B, a portion of optical surface 80 is shown in vertical cross-sectional view (along line A—A). In the embodiment shown here, prism optics 25a have a vertical cross-sectional profile that is generally linear with a decline angle m equivalent to approximately 2.950 degrees down from the horizontal. One of ordinary skill in the art will readily appreciate, however, that the vertical and longitudinal cross section of prism optics 25a may each have any suitable radius of curvature or degree of decline such that the light is distributed approximately 25–30 degrees to the left and right of vertical axis A—A.

Figure 7C:
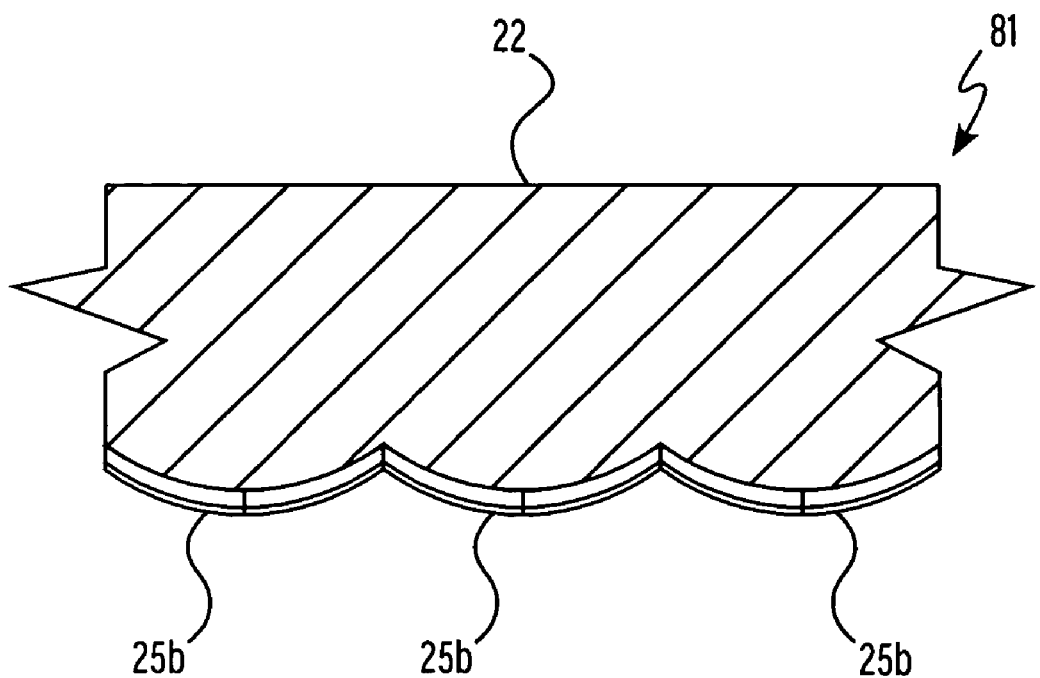
Figure 7D:
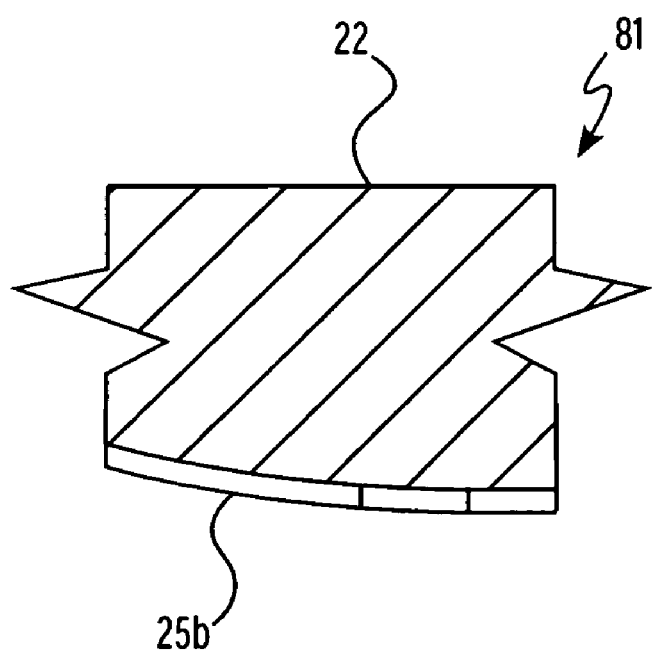

In FIG. 7C, a portion of optical surface 81 is shown in longitudinal cross-sectional view (along line $B_3$—$B_3$). Prism optics 25b preferably have a longitudinal cross sectional profile that is generally convex toward light emitting diodes 12. More specifically, in the embodiment shown here, the longitudinal cross section of prism optics 25b has a radius of curvature that is approximately 7.182 mm. In FIG. 7D, a portion of optical surface 81 is shown in vertical cross-sectional view (along line A—A). Prism optics 25b have a vertical cross sectional profile that is generally convex toward light emitting diodes 12. More specifically, in the embodiment shown here, the vertical cross section of prism optics 25b has a radius of curvature that is approximately 31.965 mm. One of ordinary skill in the art will readily appreciate, however, that the vertical and longitudinal cross section of prism optics 25b may each have any suitable radius of curvature such that the light is distributed approximately eight (8) degrees left to eight (8) degrees right of vertical axis A—A and approximately zero (0) degrees to four (4) degrees up from longitudinal axis $B_1$—$B_1$.

Figure 7E:
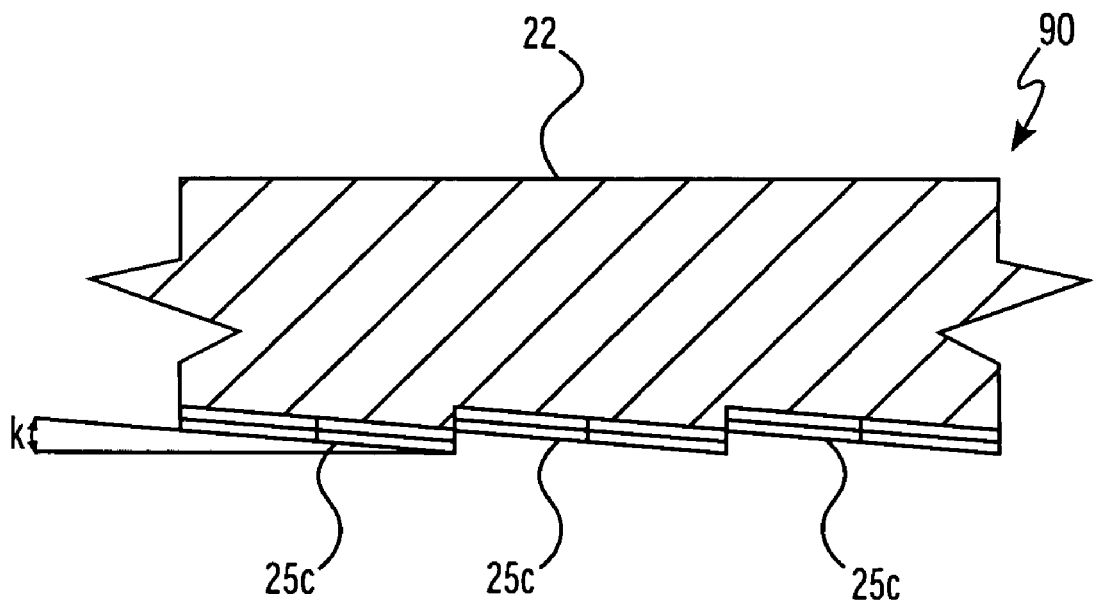
Figure 7F:
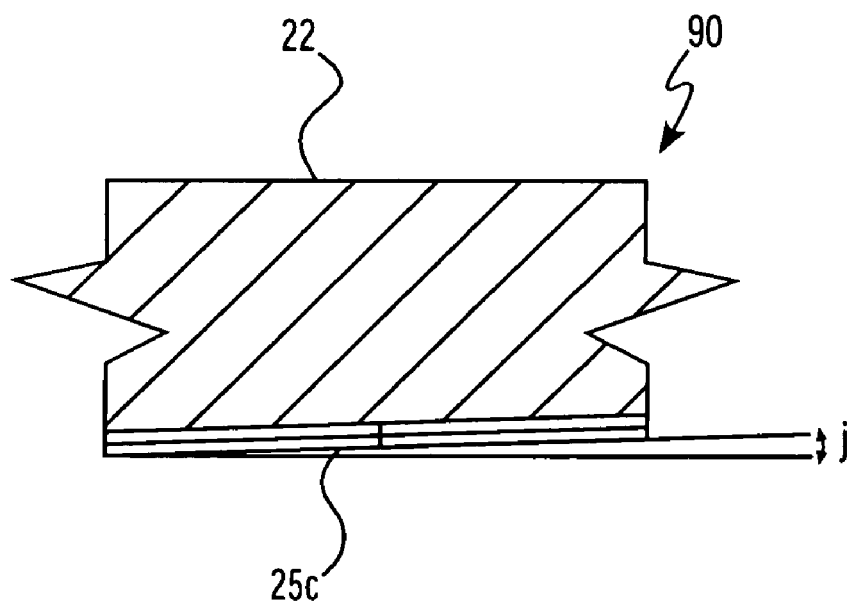

In FIG. 7E, a portion of optical surface 90 is shown in longitudinal cross-sectional view (along line $B_2$—$B_2$). Prism optics 25c preferably have a longitudinal cross sectional profile that is generally concave toward light emitting diodes 12 with an incline angle k equivalent to approximately 2.950 degrees up from the horizontal. More specifically, in the embodiment shown here, the longitudinal cross section of prism optics 25c has a radius of curvature that is approximately 30.000 mm. In FIG. 7F, a portion of optical surface 90 is shown in vertical cross-sectional view (along line A—A). In the embodiment shown here, prism optics 25c preferably have a vertical cross-sectional profile that is generally linear with an incline angle j equivalent to approximately 2.592 degrees up from the horizontal. One of ordinary skill in the art will readily appreciate, however, that the vertical and longitudinal cross section or prism optics 25c may each have any suitable radius of curvature or degree of incline such that the light is distributed approximately two (2) degrees down from longitudinal axis $B_1$—$B_1$ and approximately two (2) degrees right of vertical axis A—A.

As described hereinabove, in the embodiment shown, headlamp assembly 4 comprises two high beam headlamps 170 in addition to two (2) low beam headlamps 70 (see FIG. 1). In general, high beam headlamp 170 comprises the same components as low beam headlamp 70, namely, housing 6, reflector subassembly 11, a plurality of high-flux light emitting diodes 12, planar substrate 9, a plurality of inner light transmissive members 17, and drive circuit 5. However, rather than an outer light transmissive member 13 as disclosed supra, each high beam headlamp 170 comprises an outer light transmissive member 113 as described infra.

Figure 8:
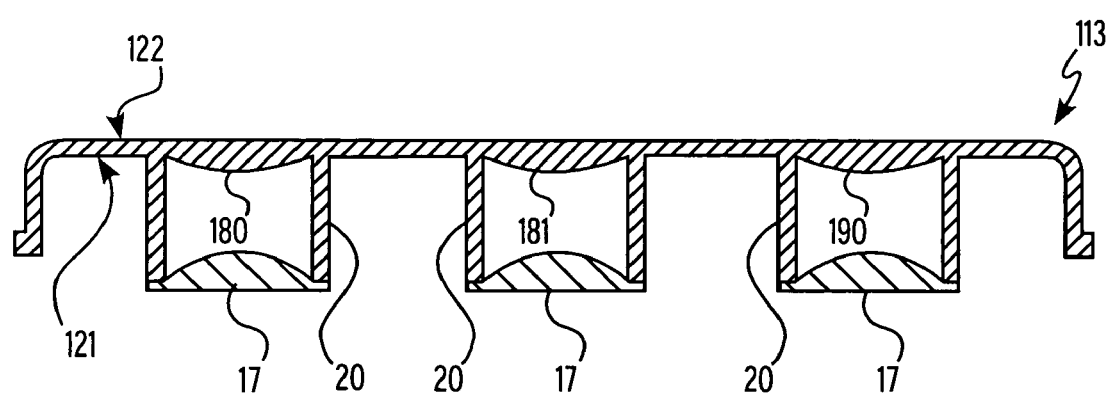
FIG. 8 illustrates a longitudinal cross-sectional view of inner and outer light transmissive members according to one embodiment of the high beam headlamp illustrated in FIG. 1.

FIG. 8 illustrates a longitudinal cross-sectional view of light transmissive member 113 along line $X_2$—$X_2$ (see FIG. 9) as provided in an individual high beam headlamp 170. As can be seen in FIG. 8, light transmissive member 113 has an inner surface 121 and outer surface 122. Similar to light transmissive member 13, a plurality of annular extensions 20 corresponding to light emitting diodes 12 extends from inner surface 121. Annular extensions 20 are support mechanisms for the plurality of inner light transmissive members 17 in the same manner described above in connection with headlamp 70.

Figure 9:
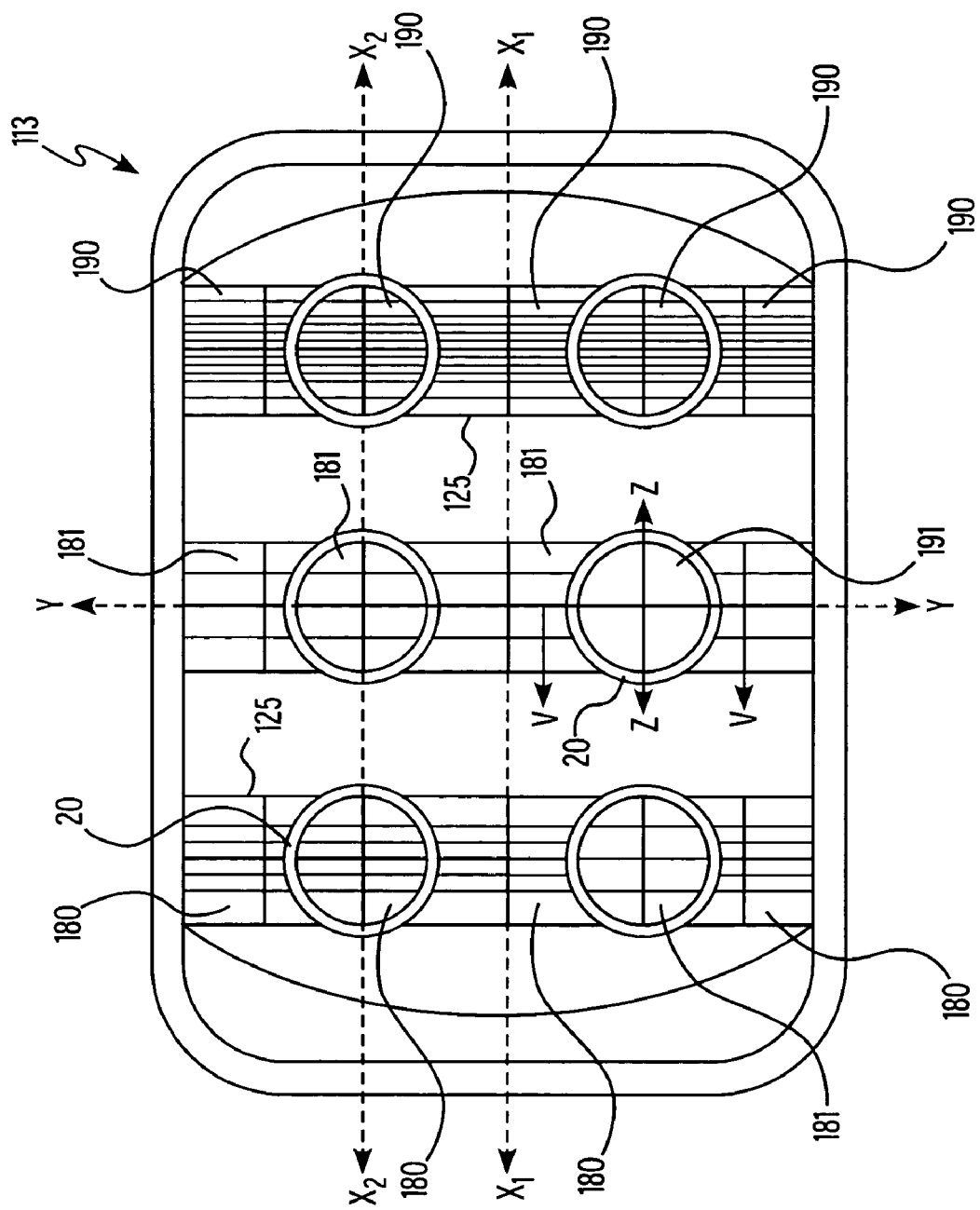
FIG. 9 shows a rear plan view of the outer light transmissive member for the high beam headlamp illustrated in FIG. 1.

FIG. 9 shows a rear top plan view of outer light transmissive member 113. Referring to FIG. 9, longitudinal axis of headlamp 170 is defined as line $X_1$—$X_1$, and vertical axis of headlamp 170 is defined as line Y—Y.

As can be seen here, high beam headlamp 170 is comprised of light transmissive member 113 is a lens with a plurality of optical elements formed on inner surface 121. Specifically, and referring to FIG. 9, inner surface 121 comprises four distinct optical surfaces 180, 181, 190, 191. Optical surfaces 180, 181, 190, 191 function as converging, or focusing, lenses to satisfy the photometric and luminescence requirements for high beam headlamps as set forth in SAE Standard J1383. In this embodiment for a high beam headlamp, optical surfaces 180, 181, 190, 191 are linear prisms with a conic cross section, whereby each prism is convex toward light emitting diodes 12 to function as a convergent optic.

For example, referring again to FIG. 8, one embodiment of optical surfaces 180, 181, and 190 is illustrated. As shown, optical surface 180 has a conic cross-sectional profile that is convex toward light emitting diodes 12. Portions of optical surface 180 disposed inside annular extensions 20 collect collimated light rays from the corresponding inner light transmissive member 17 and uniformly distribute the light rays in a horizontal direction, approximately six (6) degrees left and right of longitudinal axis to $X_1$—$X_1$. Additionally, portions of optical surface 180 disposed outside annular extensions 20 collect collimated light rays from reflector subassembly 11 and also uniformly distribute the light rays approximately six (6) degrees left and right of vertical axis Y—Y.

In this embodiment, but not intending to be limiting, optical surface 180 has radii of curvature that range from approximately 20 mm to 904 mm (a difference of 884 mm). However, one of ordinary skill in the art will readily appreciate that optical surface 180 may have any suitable range of radii of curvature such that the light rays are distributed approximately six (6) degrees left and right of vertical axis Y—Y.

Referring further to FIG. 8, optical surface 181 has a conic cross-sectional profile that is convex toward light emitting diodes 12. Portions of optical surface 181 disposed inside annular extensions 20 collect collimated light rays from the corresponding inner light transmissive member 17 and uniformly distribute the light rays in a horizontal direction, approximately three (3) degrees left and right of vertical axis Y—Y. Additionally, portions of optical surface 181 disposed outside annular extensions 20 collect collimated light rays from reflector subassembly 11 and uniformly distribute the light rays approximately three (3) degrees left and right of vertical axis Y—Y.

In this embodiment, but not intending to be limiting, optical section 181 has radii of curvature that range from approximately 48 mm to 842 mm (a difference of 794 mm). However, one of ordinary skill in the art will readily appreciate that optical surface 181 may have any suitable range of radii of curvature such that the light rays are distributed approximately three (3) degrees left and right of vertical axis Y—Y.

Referring further to FIG. 8, optical surface 190 preferably has a conic cross-sectional profile that is conic toward light emitting diodes 12. Portions of optical surface 190 disposed inside annular extensions 20 collect collimated light rays from the corresponding inner light transmissive member 17 and uniformly distribute the light rays in a horizontal direction, approximately nine (9) degrees left and right of vertical axis Y—Y. Additionally, portions of optical surface 190 disposed outside annular extensions 20 collect collimated light rays from reflector subassembly 11 and uniformly distribute the light rays approximately nine (9) degrees left and right of vertical axis Y—Y.

In this embodiment, but not intending to be limiting, optical section 190 has radii of curvature that range from approximately 7 mm to 821 mm (a difference of 814 mm). However, one of ordinary skill in the art will readily appreciate that optical surface 190 may have any suitable range of radii of curvature such that the light rays are distributed approximately nine (9) degrees left and right of vertical axis Y—Y.

Figure 10A:
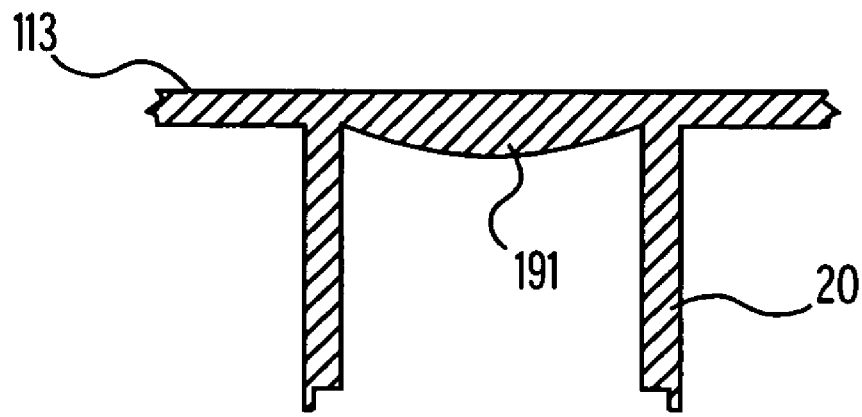
FIGS. 10A–10B show partial longitudinal and vertical cross-sections of the optical surfaces formed on the outer light transmissive member shown in FIG. 9.
Figure 10B:
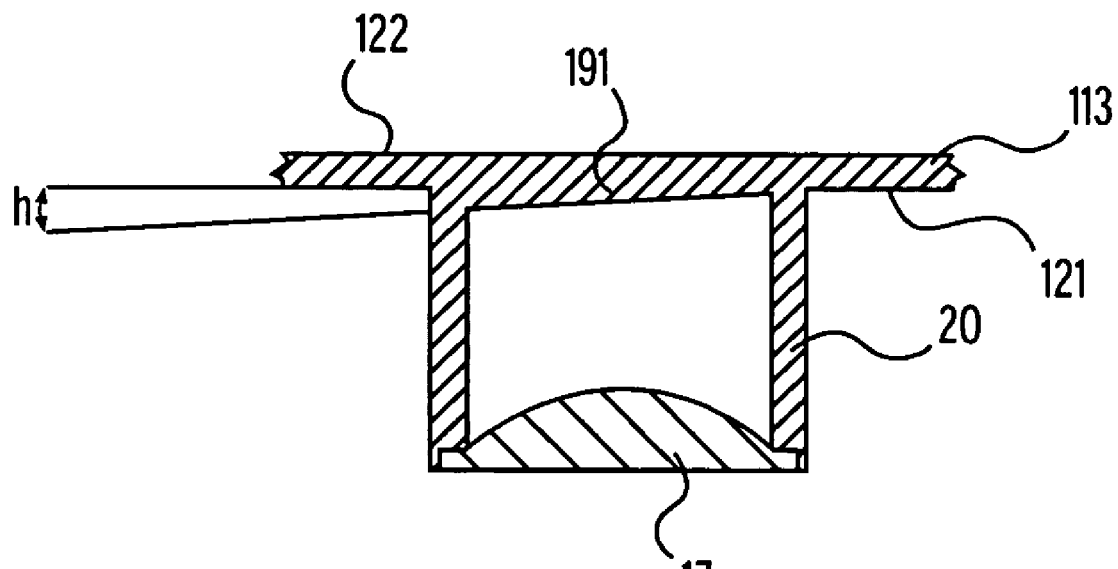

Finally, in FIG. 10A, optical surface 191 is shown in longitudinal cross-sectional view (along line Z—Z) without light transmissive member 17 and, in FIG. 10B, optical surface 191 is shown in vertical cross-sectional view (along line V—V) with light transmissive member 17. Optical surface 191, disposed only within the bottom center annular extension 20, collects collimated light rays from the corresponding inner light transmissive member 17 and uniformly distributes the light rays in a horizontal direction, approximately fifteen (15) degrees left and right of vertical axis Y—Y. Additionally, referring to FIG. 10B, optical surface 191 has a linear vertical cross-sectional profile with a decline angle h to distribute the light rays vertically approximately one (1) degree downward of longitudinal axis $X_1$—$X_1$.

In this embodiment, but not intending to be limiting, optical section 190 has radii of curvature that range from approximately 23.09 mm to 44.20 mm (a difference of 21.11 mm). Moreover, in this embodiment, decline angle h is equivalent to approximately 1.00 degree down from the horizontal. However, one of ordinary skill in the art will readily appreciate that optical surface 191 may have any suitable range of radii of curvature, or decline angle h, such that the light rays are distributed approximately fifteen (15) degrees left and right and approximately one (1) degree downward.

In practice, when high beam headlamp 170 is switched on, low beam headlamp 70 remains on to supplement the high beam pattern. Low beam headlamp 70 provides supplemental light distribution below the horizontal, for example, 2.5 degrees down and 12 degrees left and right, to satisfy the SAE requirements J1383 for a high beam pattern.

Figure 11A:
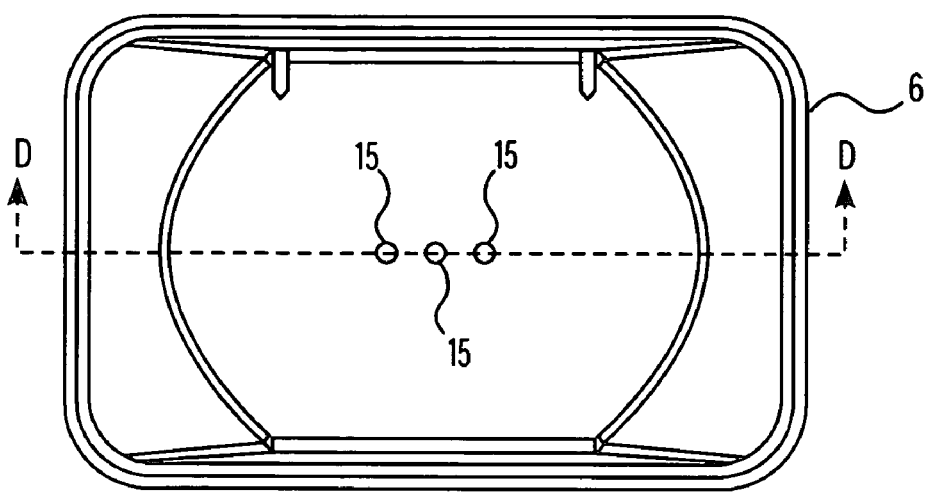
FIGS. 11A–11C illustrate a top plan view, bottom plan view and cross-sectional view, respectively, of the housing in one embodiment of the headlamp assembly.
Figure 11B:
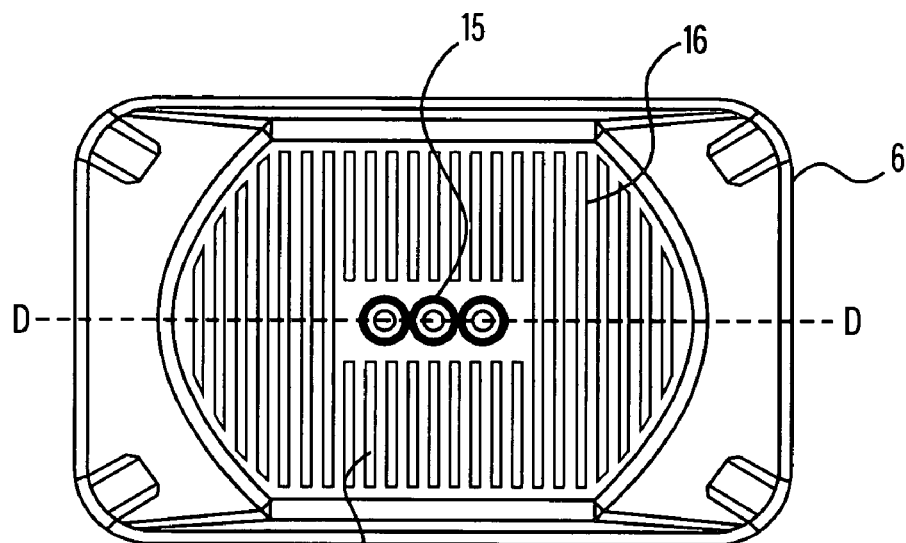
Figure 11C:
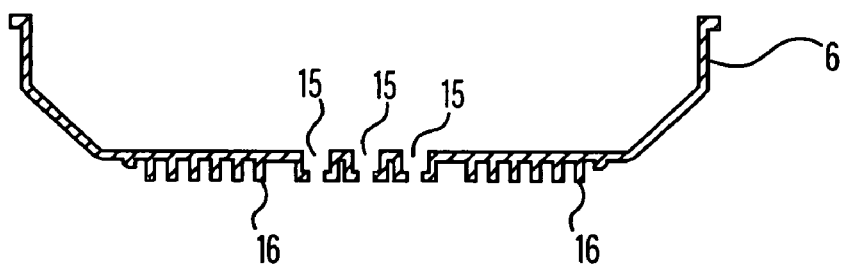

FIG. 11A illustrates a top plan view of housing 6 in one embodiment of low beam headlamp 70. FIG. 11B illustrates a bottom plan view of one embodiment of housing 6, and FIG. 11C illustrates a cross-sectional view of one embodiment of housing 6 along line D—D. In the embodiments shown and described supra, housing 6 functions as the heat sink. Accordingly, in the embodiment shown, housing 6 is made of a single piece of aluminum, either die cast or extruded. In an alternate embodiment, die cast zinc can be used for housing 6.

Housing 6 is exposed to the outside air, thereby allowing the heat transfer provided by housing 6 to be transferred to the air due to convection. In addition, as shown in FIGS. 11B–11C, a plurality of adjacent, vertically-oriented external cooling fins 16 are disposed on the bottom of housing 6 to enhance the transfer of the heat generated by light emitting diodes 12. In this way, the temperature of light emitting diodes 12 and space 7 are kept sufficiently cool to prevent degradation of the brightness of low beam headlamp 70. By preventing degradation of light emitting diodes 12, the transfer of heat via external fins 16 aids headlamp assembly 4 in meeting the requirements of SAE J1383 and the legal criteria set forth in FMVSS 108.

In the embodiment shown, low beam headlamp 70 is also potted with an epoxy. This not only provides a greater heat sink and ability to withdraw thermal energy directly away from light emitting diodes 12, but also provides protection for light emitting diodes 12 and planar substrate 9 from vibration, fatigue, and moisture.

Additionally, housing 6 also provides a mechanism to mount low beam headlamp 70 onto vehicle 1, such as a truck, tractor and/or a truck trailer. Moreover, apertures 15 are found at the bottom of housing 6. Apertures 15 are function as exit points for electrical wires to connect to circuitry outside low beam headlamp 70. In the embodiment shown, low beam headlamp 70 has three (3) apertures 15. One of ordinary skill in the art will readily appreciate that apertures 15 can also be standard headlamp terminals and can be arranged in a number of ways. As discussed above, substrate 9 is disposed within space 7 and operatively mounted to housing 6. Although not shown here, in an alternate embodiment, housing 6 for high beam headlamp 170 has two apertures 15.

In an alternate embodiment (not shown), a separate heat sink 14 is utilized. In this embodiment, housing 6 can be made of a material that does not have heat transfer properties, such as polycarbonate plastic. Heat sink 14 is made of aluminum, either die cast or extruded, or any other material with similar heat transfer properties, such as die cast zinc. Heat sink 14 is operatively mounted to the base of housing 6 and planar substrate 9 is mounted to heat sink 14.

Figure 12:
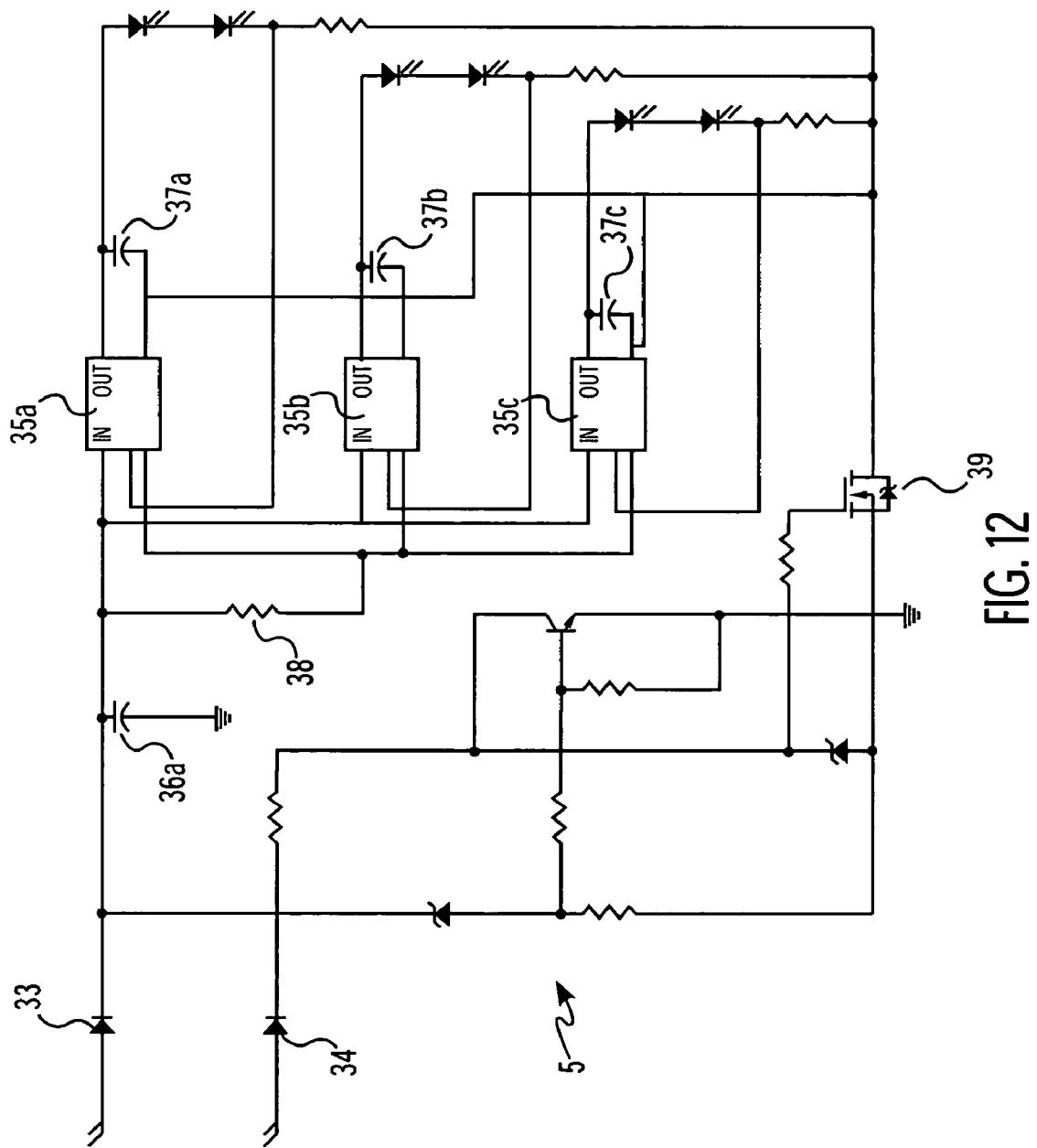
FIG. 12 illustrates one embodiment of the drive circuit in one embodiment of the headlamp assembly.

FIG. 12 shows one embodiment of drive circuit 5 in one embodiment of headlamp assembly 4. As can be seen, light emitting diodes 12, in both headlamp 70 and headlamp 170, are connected to a drive circuit 5 in series/parallel; i.e. three strings of two light emitting diodes 12. In this way, a failure of any one string will cause a reduction in light output, but not in the distribution of light.

In an embodiment of drive circuit 5 found in headlamp assembly, drive circuit 5 is a current-regulating drive circuit with over-voltage protection. Referring to FIG. 12, drive circuit 5 provides constant current to three (3) parallel strings of light emitting diodes for two (2) inputs (high/low beam) in the following manner. Drive circuit 5 comprises three of the below-described circuits—one for each parallel string of light emitting diodes. Current is regulated through a voltage range of approximately 9.5V to 16.0V. Current flows through either diode 33 for high beam input, or diode 34 for low beam input, and is filtered by capacitor 36 before input to low drop out (LDO) current regulators 35a, 35b, 35c. LDO current regulators 35a, 35b, 35c are enabled by a small current input. Current regulation is established in LDO current regulators 35a, 35b, 35c by feedback resistor 38 located on the low side of the light emitting diode load. The resistor value of feedback resistor 38 determines current flow through the string of light emitting diodes and is filtered by capacitors 37a, 37b, 37c on the output of LDO current regulators 35a, 35b, 35c.

Referring further to FIG. 12, as current returns to ground, it passes through HEXFET® switching device 39, which is enabled on/off by an over-voltage sensing circuit. When operating in designed voltage range, approximately 9.5 V-16.0 V, HEXFET® switching device 39 is enabled on and will conduct. When the voltage exceeds upper design limit, a Zener diode sensing component conducts and causes a transistor to pull low (grounding) the gate of HEXFET® switching device 39. This action disables HEXFET® switching device 39 and disconnects the ground or (negative wire) from LDO current regulators 35a, 35b, 35c and load part of circuit 5. When the voltage returns to design voltage range, the above-described process reverses, turning the load and LDO current regulators 35a, 35b, 35c back on.

In the embodiment illustrated above, drive circuit 5 is mounted on substrate 9. However, in alternate embodiments, drive circuit 5 can be separate from substrate 9 or even disposed outside one or both of low beam headlamp 70 and high beam headlamp 170. One of ordinary skill in the art will recognize that alternate circuits with current regulation to protect the light emitting diodes can be used. For example, a circuit that uses a switching power supply followed by a linear current regulator could be employed.

Figure 13A:
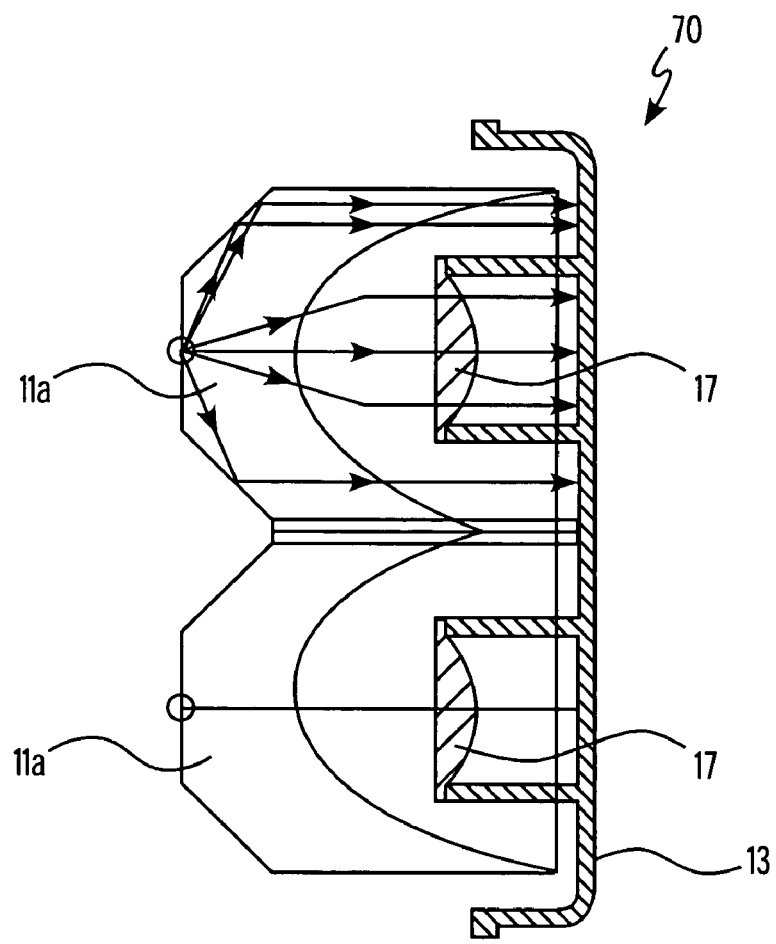
FIG. 13A illustrates the manner in which the reflector subassembly and inner light transmissive member direct light emitted from the light emitting diodes.
Figure 13B:
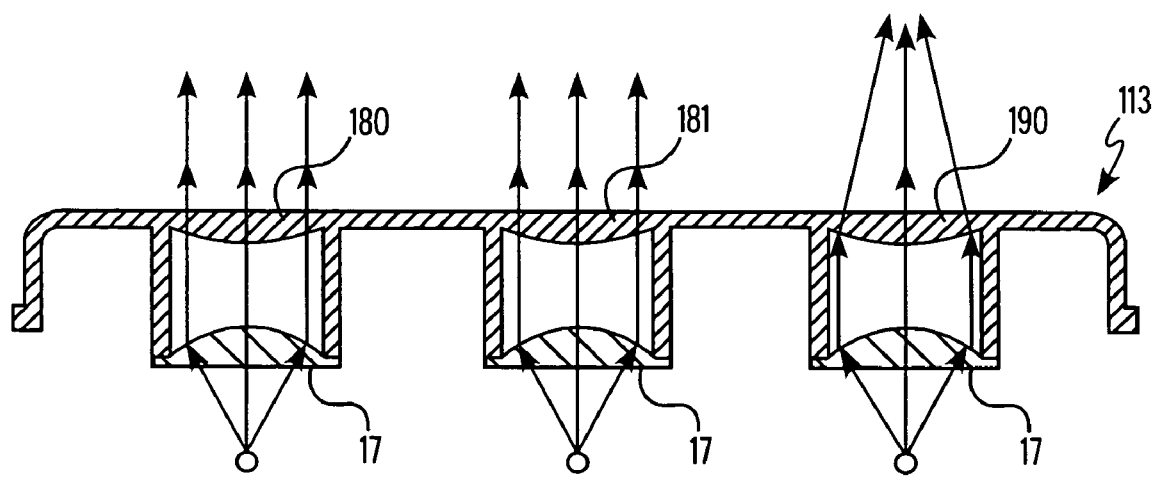
FIG. 13B illustrates the manner in which the outer light transmissive member in a high beam headlamp directs light.

FIG. 13A is a partial vertical cross-sectional view of one embodiment of low beam headlamp 70 that illustrates the manner in which light emitted from light emitting diodes 12 is directed by reflector units 11a and inner light transmissive members 17. FIG. 13B is a longitudinal cross-sectional view of outer light transmissive member 113 and inner light transmissive member 17 in high beam headlamp 170, illustrating the manner in which light received from inner light transmissive members 17 is directed by outer transmissive member 113.

Figure 14:
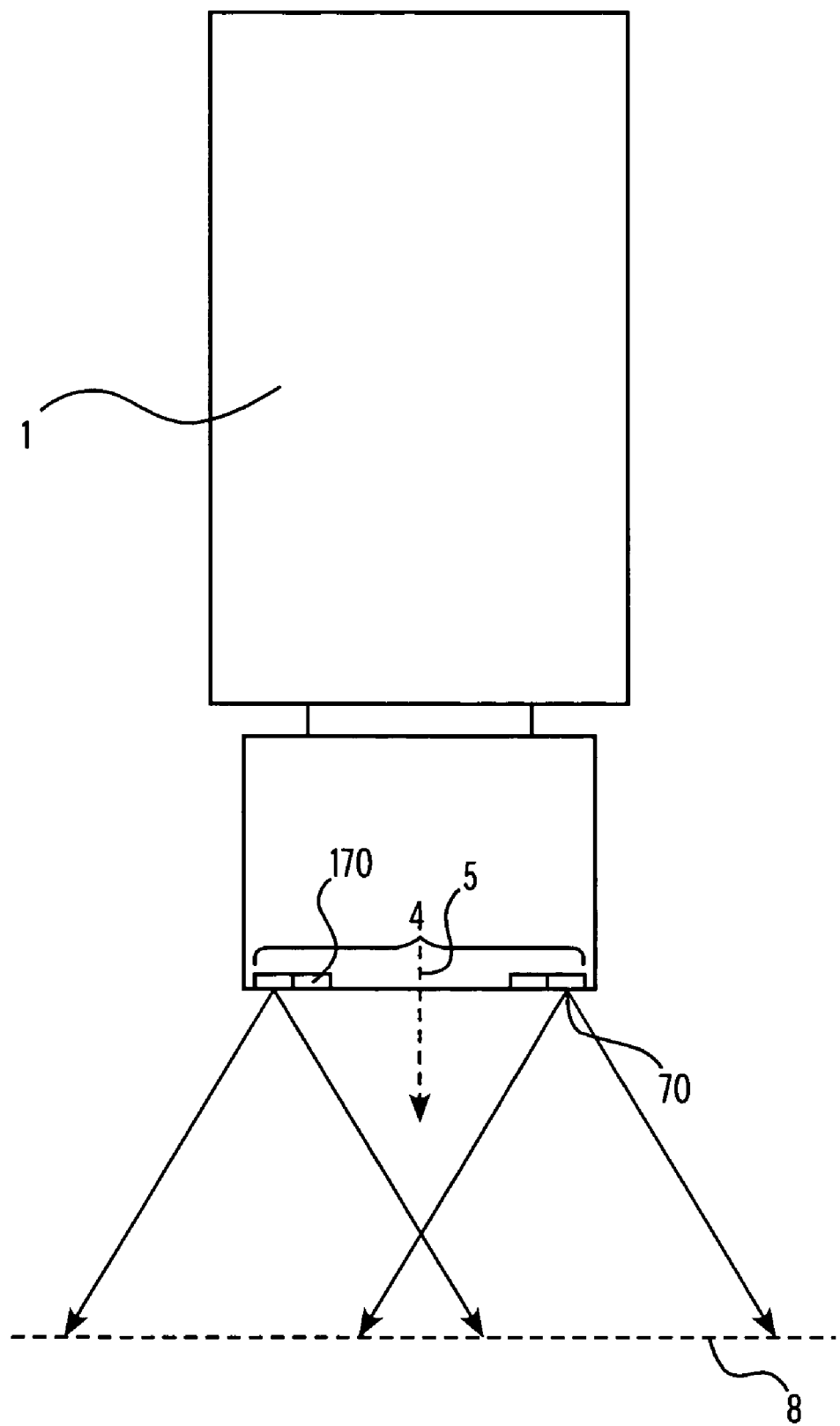
FIG. 14 is a diagrammatic, top plan view of the vehicle in FIG. 1.
Figure 15A:
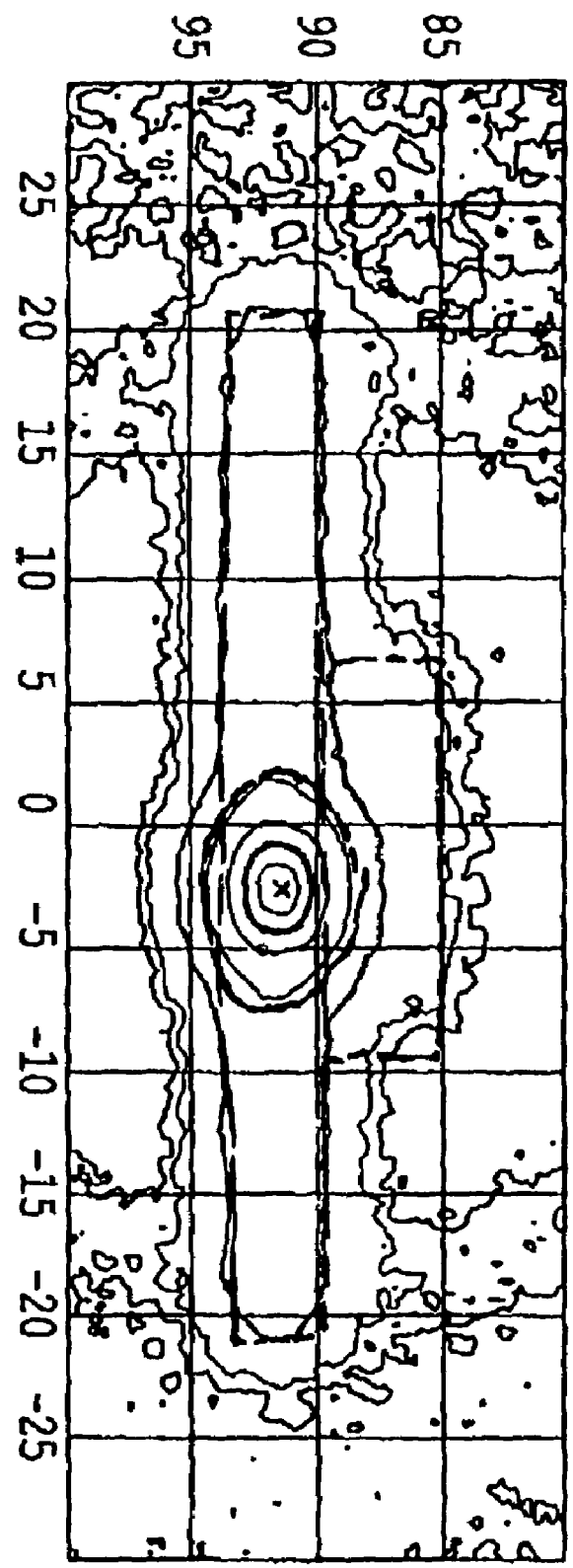
FIGS. 15A–15B illustrate the light pattern created on an imaginary surface.
Figure 15B:
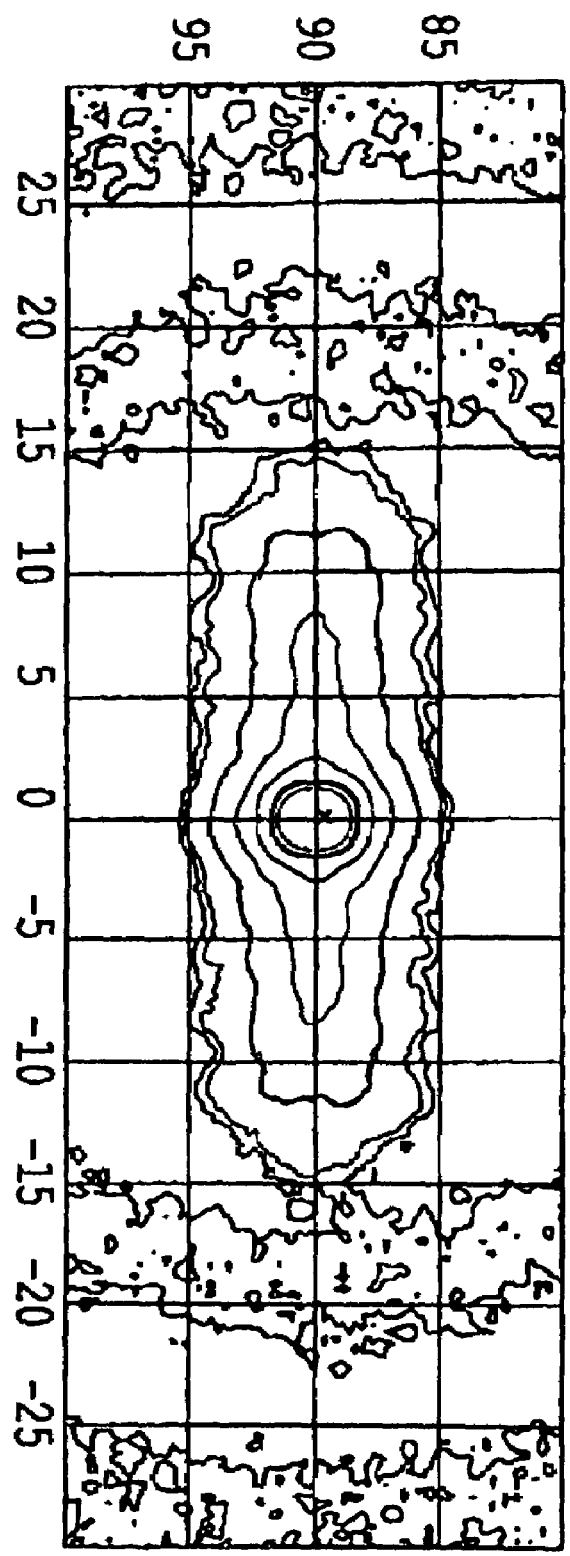

FIG. 14, a diagrammatic, top plan view of vehicle 1, illustrates the manner in which headlamp assembly 4 emits light beams in a longitudinal direction parallel to the longitudinal axis of vehicle 1. FIG. 14 further illustrates an imaginary surface 8, upon which light beams are projected. FIGS. 15A–15B illustrate the light pattern emitted by low beam headlamp 70 and high beam headlamp 170, respectively, onto imaginary surface 8.

For each of the embodiments disclosed herein, the surfaces for reflector units 11a and outer light transmissive members 13, 113 were designed and/or constructed using a Non-Uniform Rational B-Splines (NURBS) CAD modeling program, Rhinoceros 2.0 (McNeel Associates, 2001), and the final design and documentation was performed using Unigraphics CAD system.

One of ordinary skill in the art will readily appreciate that a variety of low beam and high beam headlamp arrays and arrangements are within the scope of this invention. For example, by selectively turning on portions of the light emitting diode headlamp assembly, it is possible to vary the light output to produce not only a high or low beam, but also a fog light or auxiliary high beam or driving light.

In addition, alternate light distribution patterns can be used. As the lumen output of LEDs increases as a result in technological improvements, the additional output can be dispersed in directions that satisfy aesthetic or customer-specific light patterns, but that still meet legal and SAE standards.

Figure 16A:
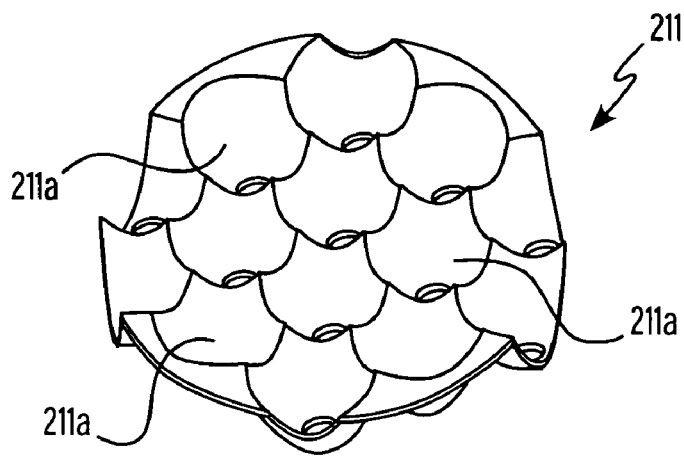
FIGS. 16A–C illustrate an alternate embodiment of the invention, a 7-inch round combined low/high beam headlamp.
Figure 16B:
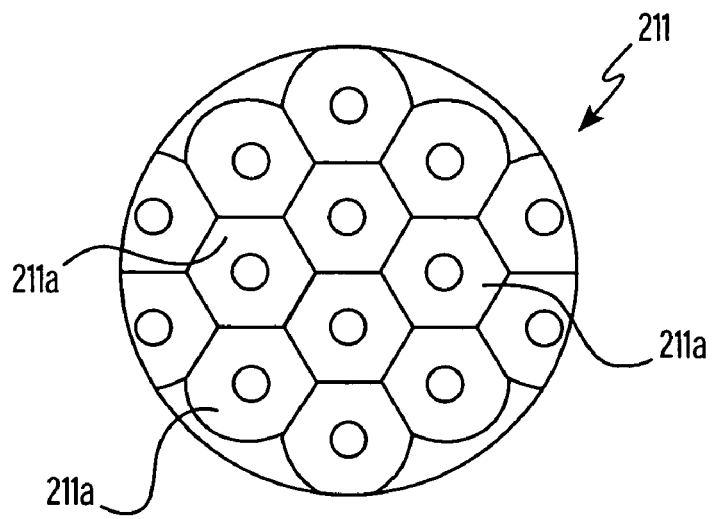

Moreover, in an alternate embodiment of a light emitting diode headlamp assembly according to the invention, a pair of combined low/high beam headlamps comprising a plurality of light emitting diodes as a light source can be utilized. FIGS. 16A–B illustrate reflector subassembly 211 in an alternate embodiment of the invention, namely a 7-inch round combined high/low beam headlamp 270. In this embodiment, two headlamps 270 would be used to form a light emitting diode headlamp assembly according to the invention.

Figure 16C:
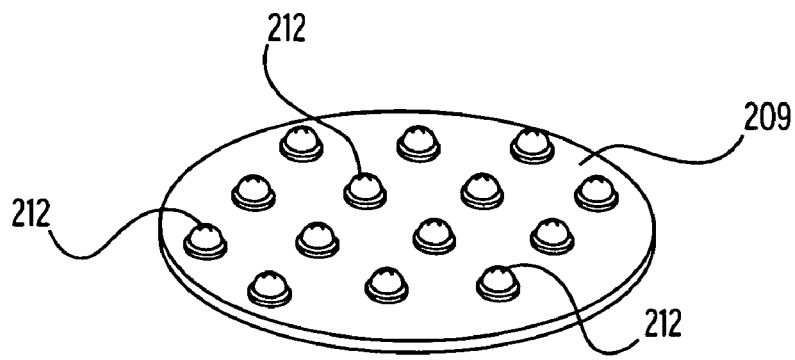

Referring to FIGS. 16A–B, reflector subassembly 211 combines twelve (12) individual reflector units 211a forming a circular arrangement such that each individual reflector unit 211a corresponds to one of twelve (12) individual light emitting diodes 212. As in the previously disclosed embodiments, reflector units 211a are parabolic reflectors. Approximately six (6) or seven (7) of light emitting diodes 212 are utilized to produce a low beam pattern for the headlamp assembly. The remainder, approximately six (6) or seven (7) of light emitting diodes 212 are utilized to produce a high beam pattern for the headlamp assembly, all in a single headlamp unit. FIG. 16C illustrates the corresponding circular arrangement of light emitting diodes 212 on a circular planar substrate 209.

In still another embodiment (not shown), a reflector subassembly combines twelve (12) individual reflector units forming a circular arrangement such that each individual reflector unit corresponds to one of twelve (12) individual light emitting diodes. Moreover, the size and shape of the combined high/low beam headlamp embodiments can vary. For example, the combined low/high beam headlamp can be rectangular, comprising a 2×5 array of light emitting diodes and a corresponding 2×5 array of parabolic reflector units forming a reflector subassembly. Again, approximately five or six of light emitting diodes are utilized to produce a low beam pattern for the headlamp assembly. The remainder, approximately five (5) or six (6), of light emitting diodes are utilized to produce a high beam pattern.

Although, for convenience, the invention has been described primarily with reference to specific embodiments, it will be apparent to those of ordinary skill in the art that the mirror assembly and the components thereof can be modified without departing from the spirit and scope of the invention as claimed.

What is claimed is:

1. A headlamp, comprising:
a housing defining an inner surface and an outer surface;
an outer light transmissive member adapted to engage with said housing, defining a three-dimensional space therebetween, said outer light transmissive member defining a lens cover, with an inner and outer face, for said housing;
a plurality of reflector units positioned within said space, said plurality of reflector units collimating a first portion of said emitted light rays, forming first incident light rays substantially parallel to a longitudinal axis of said headlamp and directed toward said lens cover;
a corresponding plurality of high-flux light emitting diodes arranged at the base of said reflector units and operatively mounted to a support member such that emitted light rays are directed away from said support member;
a plurality of inner light transmissive members adjacent to said outer light transmissive member, said plurality of inner light transmissive members collimating a second portion of said emitted light rays, forming second incident light rays substantially parallel to said longitudinal axis and directed toward said lens cover, wherein each of said plurality of inner light transmissive members is fixedly secured to at least one alignment mechanism such that each of said plurality of inner light transmissive members corresponds to one of said plurality of light emitting diodes, and wherein said at least one alignment mechanism comprises a plurality of annular extensions corresponding to said plurality of inner light transmissive members, each of said annular extensions integral to said inner face of said outer light transmissive member and extending laterally therefrom; and
a heat dissipating mechanism;
wherein said headlamp effectively emanates white light in any given direction.

2. A headlamp according to claim 1 wherein each of said plurality of inner light transmissive members is an aspheric lens.

3. A headlamp, comprising:
a plurality of light emitting diodes;
a housing formed of a material for transferring heat away from said plurality of light emitting diodes;
an outer light transmissive member with an inner and outer face, said outer light transmissive member adapted to engage with said housing to define a three-dimensional space therebetween;
a unitary reflector subassembly positioned within said space, wherein said reflector subassembly comprises an array of parabolic reflector units;
a corresponding array of high-flux light emitting diodes as a light source;
at least one inner light transmissive member adjacent to said outer light transmissive member;
at least one alignment mechanism, wherein said at least one inner light transmissive member is fixedly secured to said at least one alignment mechanism such that said at least one inner light transmissive member is aligned generally parallel to said outer light transmissive member and in front of said array of light emitting diodes; and
a driver circuit with a current regulation mechanism; and
wherein said outer light transmissive member comprises at least one optical surface to produce a wide light pattern extending approximately thirty (30) degrees left to approximately thirty (30) right of a vertical axis of said headlamp; a narrow light pattern extending approximately eight (8) degrees left to approximately eight (8) degrees right of said vertical axis and approximately zero (0) degrees to approximately four (4)

degrees up from a longitudinal axis of said headlamp; and a concentrated point of light located approximately two (2) degrees down from said longitudinal axis and approximately two (2) degrees right of said vertical axis.

4. A headlamp according to claim 3 wherein said at least one optical surface comprises a rectangular array of prism optics formed on said inner face of said outer light transmissive member.

5. A headlamp assembly comprising:
at least two headlamps comprising a plurality of high-flux light emitting diodes as a light source;
each of said at least two headlamps comprising:
a housing;
an outer light transmissive member hermetically sealed with said housing, thereby defining a three-dimensional space;
a plurality of reflector units positioned within said space and operatively arranged to correspond to said plurality of light emitting diodes;
at least one inner light transmissive member adjacent to said outer light transmissive member;
at least one alignment mechanism such that each of said at least one inner light transmission member corresponds to one of said plurality of high-flux light emitting diodes;
a heat dissipating mechanism; and
a driver circuit with a current regulation mechanism, said driver circuit operatively arranged to drive said plurality of light emitting diodes; and
wherein said at least two headlamps includes two (2) low beam headlamps and two (2) high beam headlamps and
wherein each of said low beam headlamps comprises at least one optical surface formed on said outer light transmissive member to produce white light in a distribution pattern comprising:
a wide light pattern extending approximately thirty (30) degrees left to approximately thirty (30) right of a vertical axis of said headlamp;
a narrow light pattern extending approximately eight (8) degrees left to approximately eight (8) degrees right of said vertical axis and approximately zero (0) degrees to approximately four (4) degrees up from said longitudinal axis; and
a concentrated point of light located approximately two (2) degrees down from said longitudinal axis and approximately two (2) degrees right of said vertical axis.

6. A headlamp assembly according to claim 5 wherein said at least one optical surface comprises a rectangular array of prism optics formed on said inner face of said outer light transmissive member.

7. A headlamp, comprising:
a housing defining an inner surface and an outer surface;
an outer light transmissive member adapted to engage with said housing, defining a three-dimensional space therebetween, said outer light transmissive member defining a lens cover, with an inner and outer face, for said housing and wherein said outer light transmissive member has at least one optical surface formed on said inner face of said outer light transmissive member;
a plurality of reflector units positioned within said space, said plurality of reflector units collimating a first portion of said emitted light rays, forming first incident light rays substantially parallel to a longitudinal axis of said headlamp and directed toward said lens cover;
a corresponding plurality of high-flux light emitting diodes arranged at the base of said reflector units and operatively mounted to a support member such that emitted light rays are directed away from said support member;
a plurality of inner light transmissive members adjacent to said outer light transmissive member, said plurality of inner light transmissive members collimating a second portion of said emitted light rays, forming second incident light rays substantially parallel to said longitudinal axis and directed toward said lens cover, wherein each of said plurality of inner light transmissive members is fixedly secured to at least one alignment mechanism such that each of said plurality of inner light transmissive members corresponds to one of said plurality of light emitting diodes; and
a heat dissipating mechanism;
wherein said headlamp effectively emanates white light in any given direction; and
wherein said at least one optical surface includes:
a first optical surface for producing a first light pattern extending approximately six (6) degrees left and right of a longitudinal axis of said headlamp;
a second optical surface for producing a second light pattern extending approximately three (3) degrees left to approximately three (3) right of a vertical axis of said headlamp;
a third optical surface for producing a third light pattern extending approximately nine (9) degrees left to approximately nine (9) right of said vertical axis; and
a fourth optical surface for producing a fourth light pattern extending approximately fifteen (15) degrees left to approximately fifteen (1) degrees right of said vertical axis of said headlamp and approximately one (1) degree downward from said longitudinal axis.

8. A headlamp according to claim 7 wherein said at least one optical surface comprises a plurality of adjacent, linear prisms formed on said inner face of said outer light transmissive member.

9. A headlamp according to claim 8 wherein each of said linear prisms has a conic cross section and is generally convex toward said plurality of light emitting diodes to function as a convergent optic.

10. A headlamp, comprising:
a plurality of light emitting diodes;
a housing formed of a material for transferring heat away from said plurality of light emitting diodes;
an outer light transmissive member with an inner and outer face, said outer light transmissive member adapted to engage with said housing to define a three-dimensional space therebetween;
a unitary reflector subassembly positioned within said space, wherein said reflector subassembly comprises an array of parabolic reflector units;
a corresponding array of high-flux light emitting diodes as a light source;
at least one inner light transmissive member adjacent to said outer light transmissive member;
at least one alignment mechanism, wherein said at least one inner light transmissive member is fixedly secured to said at least one alignment mechanism such that said at least one inner light transmissive member is aligned generally parallel to said outer light transmissive member and in front of said array of light emitting diodes; and a driver circuit with a current regulation mechanism; and
wherein said outer light transmissive member comprises
at least one optical surface to produce a first light
pattern extending approximately six (6) degrees left
and right of a longitudinal axis of said headlamp; a
second light pattern extending approximately three (3)
degrees left to approximately three (3) right of a
vertical axis of said headlamp; a third light pattern
extending approximately nine (9) degrees left to
approximately nine (9) right of said vertical axis; and a
fourth light pattern extending approximately fifteen
(15) degrees left to approximately fifteen (1) degrees
right of said vertical axis of said headlamp and approximately one (1) degree downward from said longitudinal
axis.

11. A headlamp according to claim 10 wherein said at least one optical surface comprises a plurality of adjacent linear prisms formed on said inner face of said outer light transmissive member.

12. A headlamp according to claim 11 wherein each of said plurality of linear prisms has a conic cross section and is generally convex toward said plurality of light emitting diodes to function as a convergent optic.

13. A headlamp assembly comprising:
at least two headlamps comprising a plurality of high-flux light emitting diodes as a light source;
each of said at least two headlamps comprising:
a housing;
an outer light transmissive member hermetically sealed with said housing, thereby defining a three-dimensional space;
a plurality of reflector units positioned within said space and operatively arranged to correspond to said plurality of light emitting diodes;
at least one inner light transmissive member adjacent to said outer light transmissive member;
at least one alignment mechanism such that each of said at least one inner light transmission member corresponds to one of said plurality of high-flux light emitting diodes;
a heat dissipating mechanism; and
a driver circuit with a current regulation mechanism, said driver circuit operatively arranged to drive said plurality of light emitting diodes; and
wherein said at least two headlamps includes two (2) low beam headlamps and two (2) high beam headlamps and
wherein each of said high beam headlamps comprises at least one optical surface formed on said outer light transmissive member to produce white light in a distribution pattern comprising:
a first light pattern extending approximately six (6) degrees left and right of the longitudinal axis;
a second light pattern extending approximately three (3) degrees left to approximately three (3) right of said vertical axis;
a third light pattern extending approximately nine (9) degrees left to approximately nine (9) right of said vertical axis;
and a fourth light pattern extending approximately fifteen (15) degrees left to approximately fifteen (1) degrees right of said vertical axis of said headlamp and approximately one (1) degree downward from said longitudinal axis.

14. A headlamp assembly according to claim 13 wherein said at least one optical surface comprises a plurality of adjacent linear prisms formed on said inner face of said outer light transmissive member.

15. A headlamp assembly according to claim 14 wherein each of said linear prisms has a conic cross section and is generally convex toward said plurality of light emitting diodes to function as a convergent optic.

16. A headlamp, comprising:
a housing defining an inner surface and an outer surface;
an outer light transmissive member adapted to engage with said housing, defining a three-dimensional space therebetween, said outer light transmissive member defining a lens cover, with an inner and outer face, for said housing and wherein said outer light transmissive member has at least one optical surface formed on said inner face of said outer light transmissive member;
a plurality of reflector units positioned within said space, said plurality of reflector units collimating a first portion of said emitted light rays, forming first incident light rays substantially parallel to a longitudinal axis of said headlamp and directed toward said lens cover;
a corresponding plurality of high-flux light emitting diodes arranged at the base of said reflector units and operatively mounted to a support member such that emitted light rays are directed away from said support member;
a plurality of inner light transmissive members adjacent to said outer light transmissive member, said plurality of inner light transmissive members collimating a second portion of said emitted light rays, forming second incident light rays substantially parallel to said longitudinal axis and directed toward said lens cover, wherein each of said plurality of inner light transmissive members is fixedly secured to at least one alignment mechanism such that each of said plurality of inner light transmissive members corresponds to one of said plurality of light emitting diodes; and
a heat dissipating mechanism;
wherein said headlamp effectively emanates white light in any given direction; and
wherein said at least one optical surface includes a first optical surface for producing a wide light pattern extending approximately thirty (30) degrees left to approximately thirty (30) right of a vertical axis of said headlamp, a second optical surface for producing a narrow light pattern extending approximately eight (8) degrees left to approximately eight (8) degrees right of said vertical axis and approximately zero (0) degrees to approximately four (4) degrees up from a longitudinal axis of said headlamp, and a third optical surface for producing a concentrated point of light located approximately two (2) degrees down from said longitudinal axis and approximately two (2) degrees right of said vertical axis.

17. A headlamp according to claim 16 wherein said at least one optical surface comprises a rectangular array of prism optics.

18. A headlamp according to claim 16 wherein said first optical surface comprises prism optics generally convex toward said plurality of light emitting diodes.

19. A headlamp according to claim 16 wherein said second optical surface comprises prism optics generally convex toward said plurality of light emitting diodes.

20. A headlamp according to claim 16 wherein said third optical surface comprises prism optics generally concave toward said plurality of light emitting diodes.

21. A headlamp, comprising:

a housing defining an inner surface and an outer surface;

an outer light transmissive member adapted to engage with said housing, defining a three-dimensional space therebetween;

a plurality of reflector units positioned within said space;

a corresponding plurality of high-flux light emitting diodes arranged at the base of said reflector units and operatively mounted to a support member;

a plurality of inner light transmissive members adjacent to said outer light transmissive member;

a plurality of annular extensions integral to said outer light transmissive member, wherein said plurality of inner light transmissive members are fixedly secured to said plurality of annular extensions;

a heat dissipating mechanism for transferring heat away from said plurality of light emitting diodes; and a driver circuit with a current regulation mechanism;

wherein said headlamp effectively emanates white light in any given direction.

22. A headlamp, comprising:

a housing;

an outer light transmissive member adapted to engage with said housing to define a three-dimensional space therebetween;

a plurality of reflector units positioned within said space;

a corresponding plurality of high-flux light emitting diodes as a light source arranged at the base of said reflector units;

a plurality of inner light transmissive members adjacent to said outer light transmissive member; and a rectangular array of prism optics formed on said outer light transmissive member such that said headlamp produces white light in a distribution pattern comprising:

a wide light pattern extending approximately thirty (30) degrees left to approximately thirty (30) right of a vertical axis of said headlamp;

a narrow light pattern extending approximately eight (8) degrees left to approximately eight (8) degrees right of said vertical axis and approximately zero (0) degrees to approximately four (4) degrees up from a longitudinal axis of said headlamp; and a concentrated point of light located approximately two (2) degrees down from said longitudinal axis and approximately two (2) degrees right of said vertical axis.

23. A headlamp, comprising:

a housing;

an outer light transmissive member adapted to engage with said housing to define a three-dimensional space therebetween;

a plurality of reflector units positioned within said space;

a corresponding plurality of high-flux light emitting diodes as a light source arranged at the base of said reflector units;

a plurality of inner light transmissive members adjacent to said outer light transmissive member;

and a plurality of adjacent linear optics formed on said outer light transmissive member such that said headlamp produces white light in a distribution pattern comprising:

a first light pattern extending approximately six (6) degrees left and right of a longitudinal axis of said headlamp;

a second light pattern extending approximately three (3) degrees left to approximately three (3) right of a vertical axis of said headlamp;

a third light pattern extending approximately nine (9) degrees left to approximately nine (9) right of said vertical axis; and a fourth light pattern extending approximately fifteen (15) degrees left to approximately fifteen (1) degrees right of said vertical axis of said headlamp and approximately one (1) degree downward from said longitudinal axis.

* * * * *